(12) United States Patent
Freed et al.

(10) Patent No.: US 10,267,300 B2
(45) Date of Patent: Apr. 23, 2019

(54) PLUNGER CLAMP FOR FLUID END

(71) Applicant: FORUM US, INC., Houston, TX (US)

(72) Inventors: Wesley Freed, Aledo, TX (US); Austin Chunn, Aledo, TX (US); Chase Tipton, Weatherford, TX (US)

(73) Assignee: FORUM US, INC., Houston, TX (US)

( * ) Notice: Subject to any disclaimer, the term of this patent is extended or adjusted under 35 U.S.C. 154(b) by 285 days.

(21) Appl. No.: 15/070,482

(22) Filed: Mar. 15, 2016

(65) Prior Publication Data

US 2017/0218932 A1 Aug. 3, 2017

Related U.S. Application Data

(63) Continuation-in-part of application No. 15/013,034, filed on Feb. 2, 2016.

(51) Int. Cl.
| | |
|---|---|
| *F04B 39/00* | (2006.01) |
| *F04B 39/14* | (2006.01) |
| *F16J 1/14* | (2006.01) |
| *F04B 53/14* | (2006.01) |
| *F04B 53/22* | (2006.01) |

(52) U.S. Cl.
CPC ...... *F04B 39/0022* (2013.01); *F04B 39/0094* (2013.01); *F04B 39/14* (2013.01); *F04B 53/147* (2013.01); *F16J 1/14* (2013.01); *F04B 53/22* (2013.01)

(58) Field of Classification Search
CPC .. F04B 53/14; F04B 53/147; F16J 1/10; F16J 1/14; Y10T 403/5706; Y10T 304/5733; Y10T 403/5741
USPC .................................... 92/128, 147
See application file for complete search history.

(56) References Cited

U.S. PATENT DOCUMENTS

| | | | | |
|---|---|---|---|---|
| 2,574,648 | A | * 11/1951 | Mason | ..... F16B 7/182 403/182 |
| 2,744,777 | A | * 5/1956 | Mucher | ..... H01C 10/32 116/DIG. 21 |
| 5,127,807 | A | 7/1992 | Eslinger | |
| 5,419,538 | A | * 5/1995 | Nicholas | ..... E04F 11/1812 256/59 |
| 6,171,070 | B1 | * 1/2001 | Mitake | ..... F04B 1/00 123/45 A |
| 7,350,832 | B1 | 4/2008 | Kiely | |
| 8,701,546 | B2 | * 4/2014 | Pacht | ..... F04B 1/0408 92/128 |

(Continued)

FOREIGN PATENT DOCUMENTS

DE  1703966 A1 * 2/1972 ............ F04B 17/042

OTHER PUBLICATIONS

International Search Report and Written Opinion for Application No. PCT/US2016/066598 dated Jun. 30, 2017.

(Continued)

*Primary Examiner* — Michael Leslie
*Assistant Examiner* — Matthew Wiblin
(74) *Attorney, Agent, or Firm* — Patterson + Sheridan, LLP

(57) ABSTRACT

A plunger clamp is disclosed that includes a body comprising a first end and a second end, wherein the body comprises a threaded portion that facilitates coupling and decoupling of the first and second ends, and wherein the first end or the second end includes a plurality of blind holes formed on a perimeter thereof that extend in a direction orthogonal to a longitudinal axis of the body.

16 Claims, 21 Drawing Sheets

(56) References Cited

U.S. PATENT DOCUMENTS

| | | | |
|---|---|---|---|
| 2008/0116688 A1* | 5/2008 | Bull | F16L 15/009 |
| | | | 285/386 |
| 2011/0142699 A1* | 6/2011 | Pacht | F04B 53/147 |
| | | | 417/437 |
| 2012/0164004 A1 | 6/2012 | Thomeer et al. | |
| 2013/0068092 A1* | 3/2013 | Marette | F16J 13/00 |
| | | | 92/169.2 |

OTHER PUBLICATIONS

International Search Report and Written Opinion for Application No. PCT/US2016/066616 dated Mar. 15, 2017.

* cited by examiner

PLUNGER CLAMP FOR FLUID END

CROSS-REFERENCE TO RELATED APPLICATION

This application is a continuation-in-part of U.S. patent application Ser. No. 15/013,034, filed Feb. 2, 2016, which is hereby incorporated by reference herein.

BACKGROUND OF THE INVENTION

Field

Embodiments of the disclosure generally relate to a plunger clamp utilized in fluid ends in pressurized fluid delivery systems that transfer high volumes of fluids at extreme pressures.

Description of the Related Art

Pressurized fluid delivery systems which include fluid cylinder blocks for transferring fluids at high pressures are used in multiple industries. One example where such systems are used includes the oil and gas industry where high pressure fluid reciprocating pumps, such as multiplex plunger pumps, are commonly used. These types of pumps have a fluid end that includes valves, plungers, liners, among other components, that is driven by a power end that converts the rotation of a drive shaft to the reciprocating motion of the plunger(s) in the fluid end. The pumps facilitate pumping at rates of up to 100 bbl/minute, and are capable of creating variable pressures, e.g., between negative pressures during suction to a discharge pressure of about 1,000 pounds per square inch (psi), or more. A plunger clamp is used to connect a pony rod of the drive shaft to the plunger.

Conventional plunger clamps are typically compact, one piece structures having a plate on both ends that facilitates coupling of the clamp to the pony rod and the plunger. Each of the plates have fastener holes disposed in shallow blind cavities between the plates. The fastener holes have a bolt pattern that matches a respective bolt pattern of the pony rod and the plunger. Fasteners are inserted into shallow cavities and into the fastener holes during assembly. The fasteners should then be tightened to a specific torque value. However, the close quarters of the shallow cavities make it difficult to insert tools used to tighten and/or verify the torque value. Additionally, debris, such as sand, often packs tightly into the cavities making it even more difficult to insert and/or properly tighten the fasteners. Oftentimes a user may simply tighten the fasteners by hand, or even forego verifying the torque value due to the difficulty of coupling a torque wrench to the fasteners. This presents a major safety hazard as the improperly tightened fasteners may come loose or break during operation which results in injury to personnel and/or damage to the equipment.

Therefore, there exists a need for an improved plunger clamp.

SUMMARY

In one embodiment, a plunger clamp is described that includes a body comprising a first end, a second end, and a clamp connector and a center retainer disposed between the first and second ends, wherein the clamp connector comprises a threaded portion that interfaces with the first end facilitating relative rotation with, and separation from, the first end, and wherein the center retainer comprises a threaded portion that interfaces with the second end facilitating relative rotation with, and separation from, the second end.

In another embodiment, a plunger clamp is disclosed that includes a body comprising a first end and a second end, wherein the body comprises a threaded portion that facilitates coupling and decoupling of the first and second ends, and wherein the first end and the second end includes a plurality of blind holes formed on a perimeter thereof that extend in a direction orthogonal to a longitudinal axis of the body.

In another embodiment, a fluid end is described that includes a body having a plurality of bores formed therein that intersect at a junction, a plunger disposed in one of the bores, and a plunger clamp coupled to the plunger. The plunger clamp comprises a body comprising a first end and a second end, wherein the body comprises a threaded portion that facilitates coupling and decoupling of the first and second ends, and wherein the first end or the second end includes a plurality of blind holes formed on a perimeter thereof that extend in a direction orthogonal to a longitudinal axis of the body.

BRIEF DESCRIPTION OF THE DRAWINGS

Having generally described the various embodiments of the disclosure, reference will now be made to the accompanying drawings.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
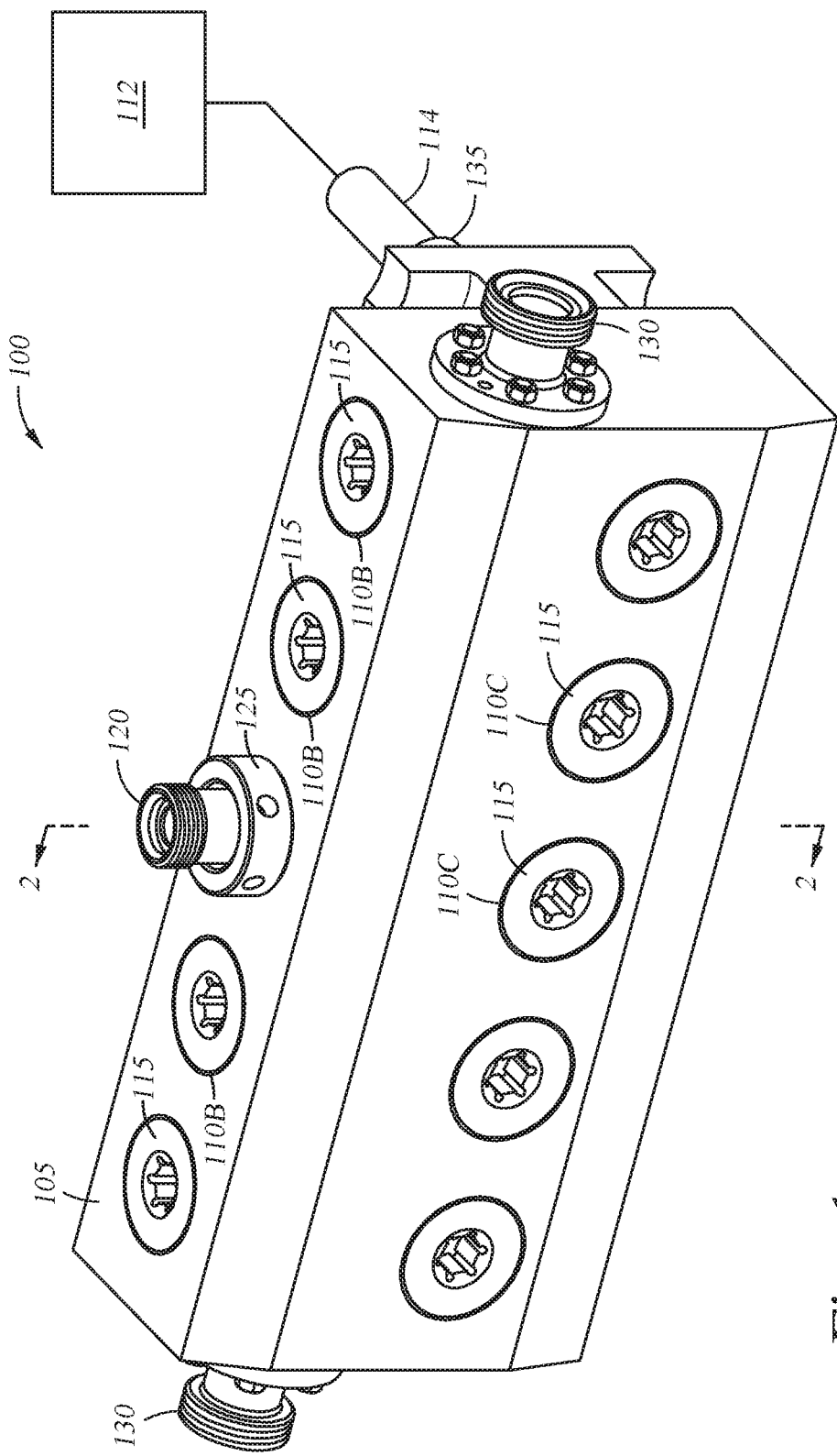
FIG. 1 is an isometric view of a fluid end.
Figure 2:
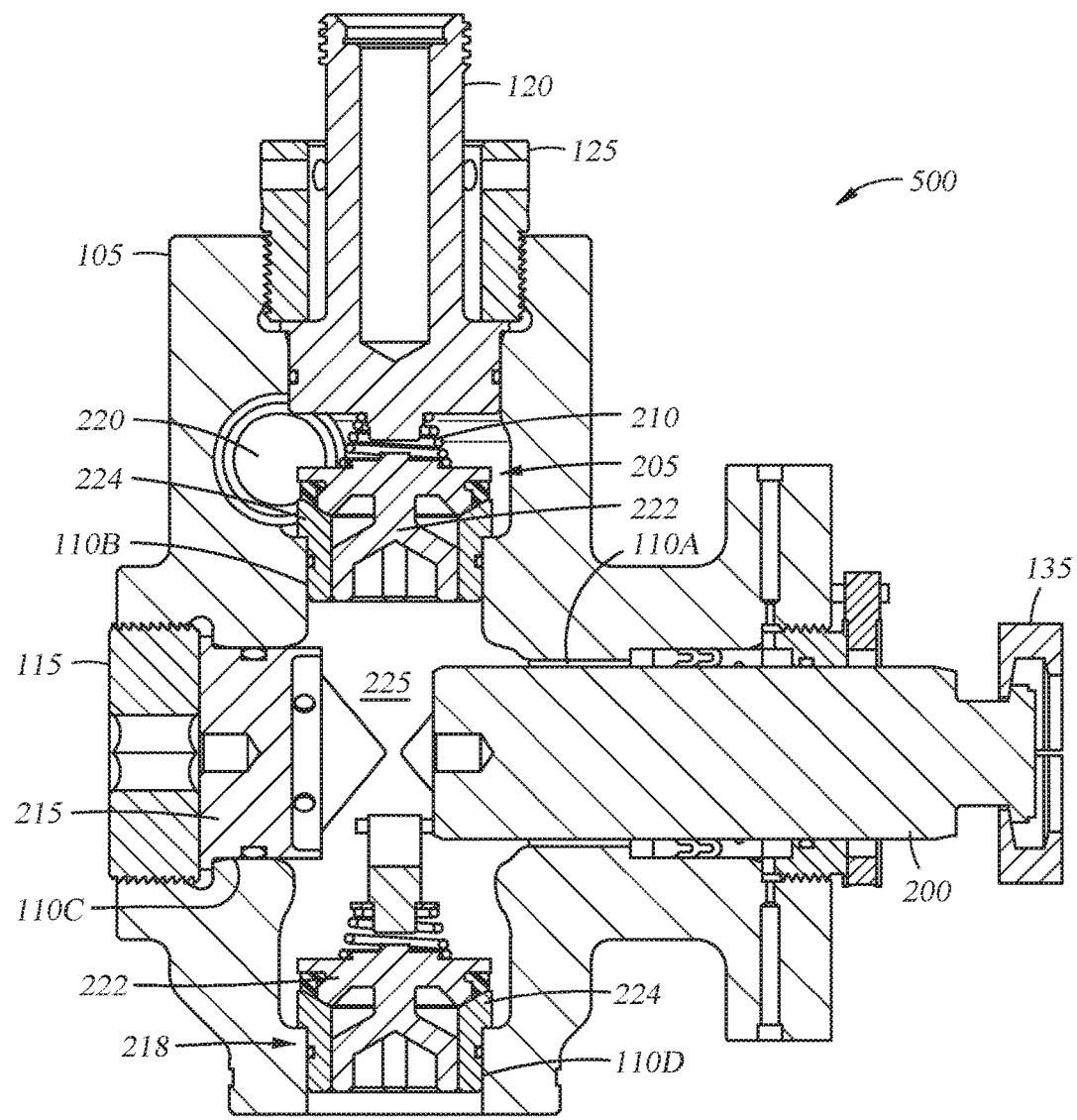
FIG. 2 is a cross-sectional view of the fluid end along lines 2-2 of FIG. 1.

FIG. 1 is an isometric view of a fluid end 100 having a fluid cylinder body 105. FIG. 2 is a cross-sectional view of the fluid end 100 along lines 2-2 of FIG. 1. The fluid end 100 includes a plurality of bores 110A-110D (110A and 110D are shown FIG. 2) formed in the body 105. The fluid end 100 is adapted to couple to a power end 112 via a pony rod 114. While only one pony rod is shown, the power end 112 may have a pony rod that couples to each of the bores 110A of the fluid end 100.

The fluid end 100 includes cover nuts 115 disposed in at least a portion of the bores 110B and 110C. A gauge connector 120 may be coupled to one of the bores 110B by a gauge connector nut 125. A discharge flange 130 may be coupled to opposing ends of the body 105 for connecting hoses with a discharge manifold (not shown). A plunger clamp 135 may be disposed between the fluid end 100 and the pony rod 114.

Referring to FIG. 2, the internal components of the fluid end 100 will be described. A plunger 200 is shown disposed in the bore 110A and a valve assembly 205 having a spring 210 is shown disposed in the bore 110B. A suction cover seal gland 215 is shown disposed in the bore 110C and a valve stop 218 is shown in bore 110D. A valve body 222 as well as a valve seat 224 may also be disposed in the bores 110B and 110D. The body 105 may also include a discharge manifold 220 formed therein that is in selective communication with at least the bore 110B. The bores 110A-110D intersect within the body 105 at a junction 225.

Figure 3A:
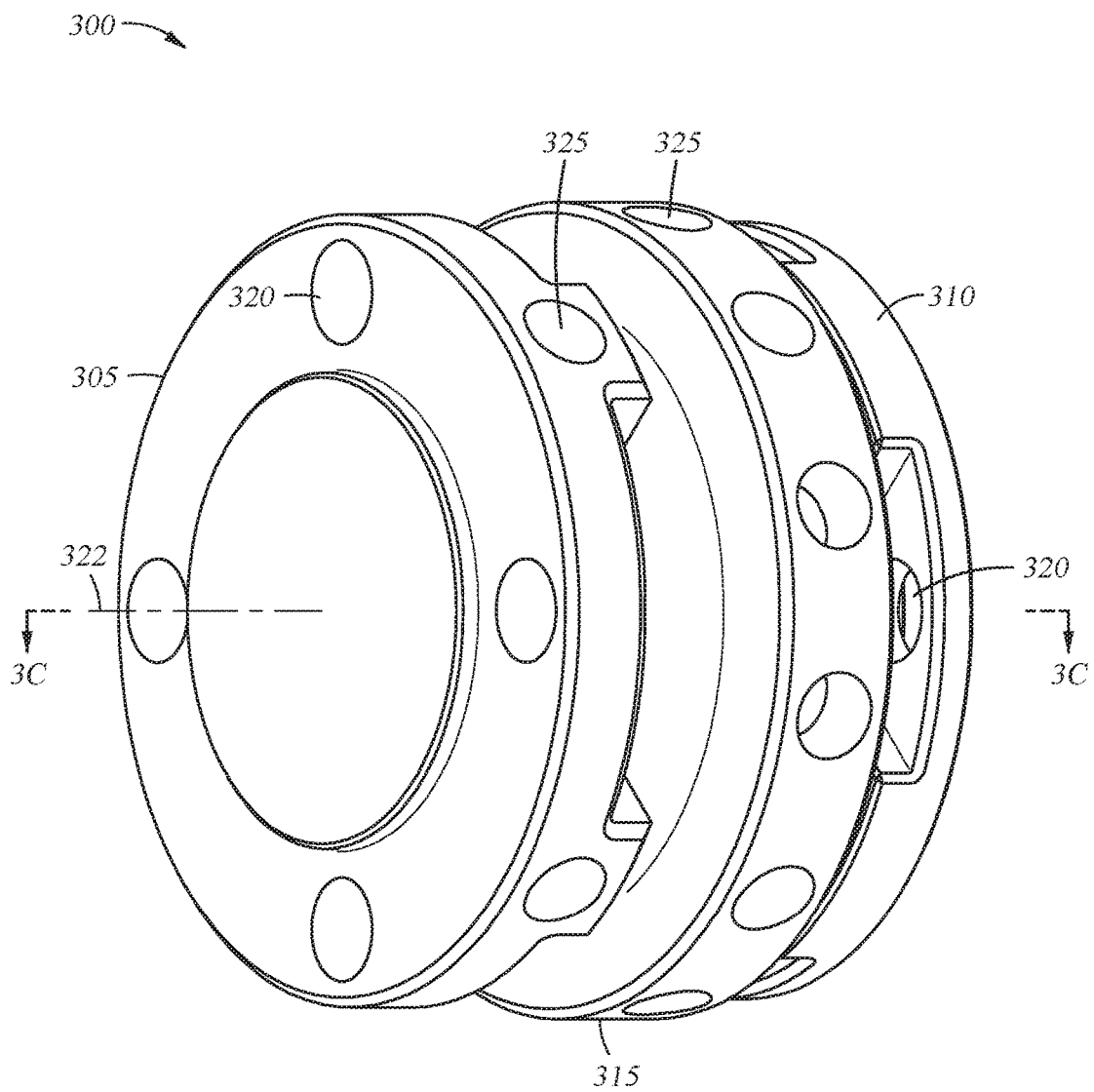
FIG. 3A is an isometric view of one embodiment of a plunger clamp.
Figure 3B:
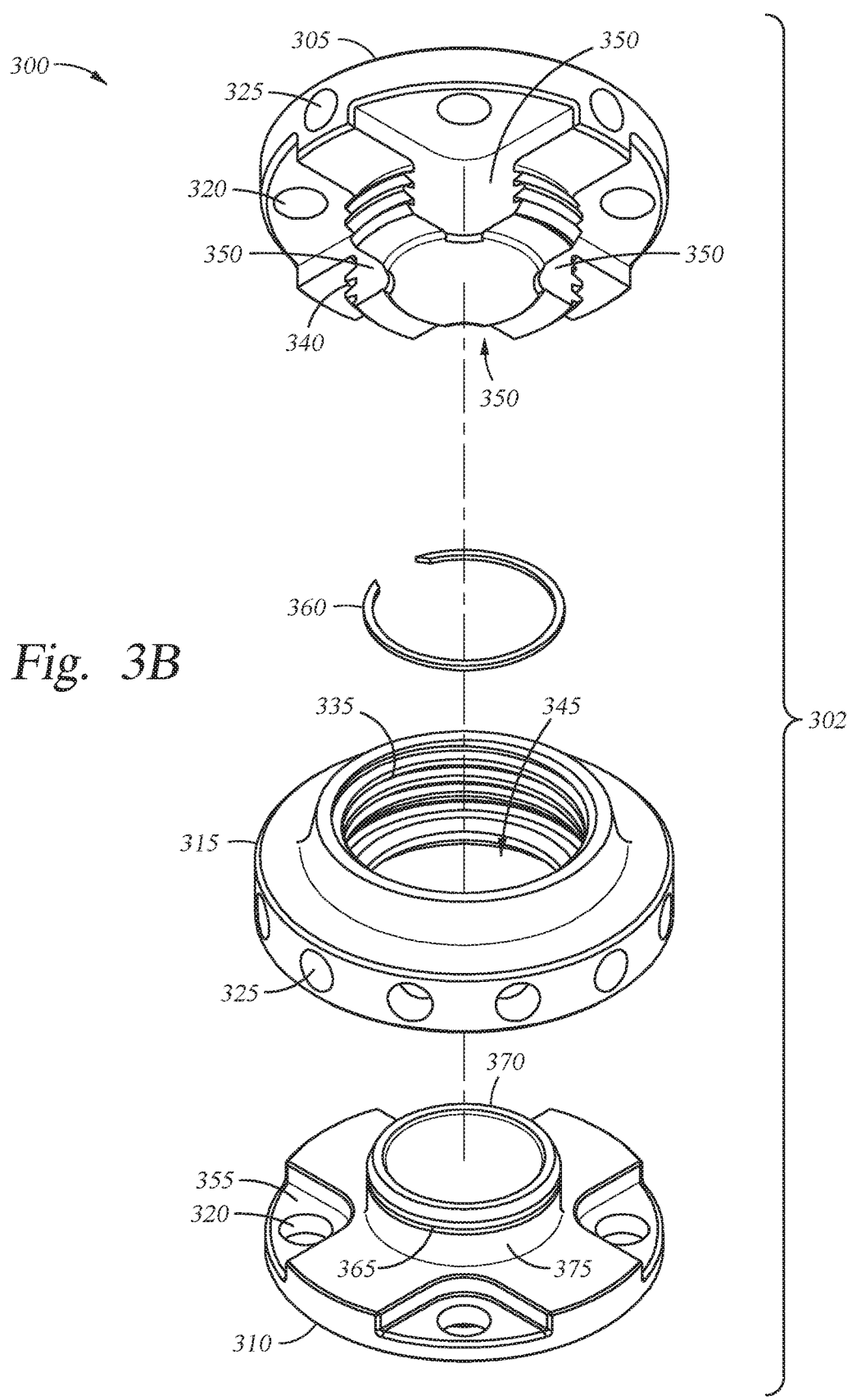
FIG. 3B is an exploded isometric view of the plunger clamp of FIG. 3A.
Figure 3C:
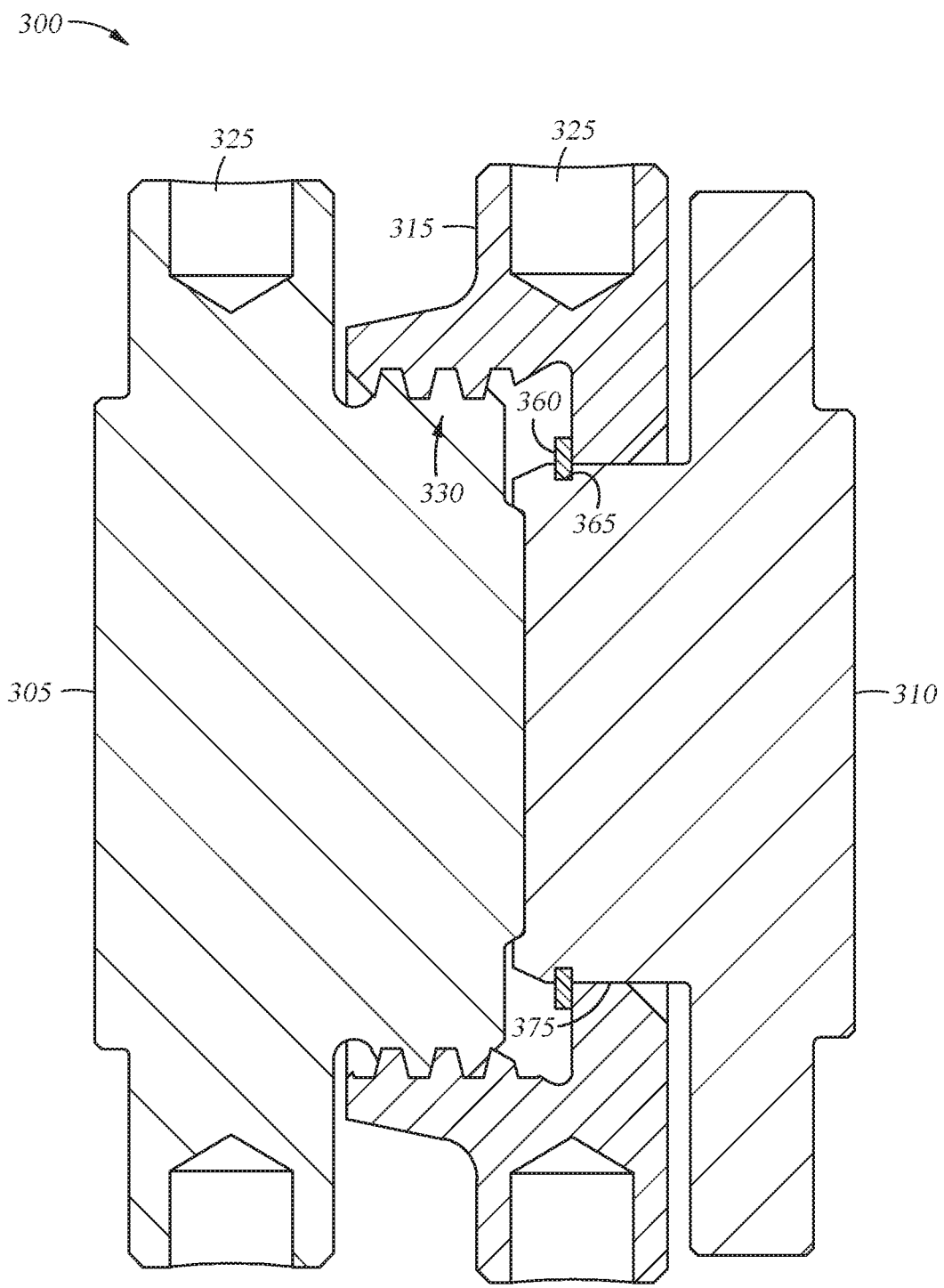
FIG. 3C is a section view of the plunger clamp along lines 3C-3C of FIG. 3A.

FIGS. 3A-3C are various views of one embodiment of a plunger clamp 300 that may be used as the plunger clamp 135 of FIGS. 1 and 2. FIG. 3A is an isometric view of the plunger clamp 300. FIG. 3B is an exploded isometric view of the plunger clamp 300 of FIG. 3A. FIG. 3C is a section view of the plunger clamp 300 along lines 3C-3C of FIG. 3A.

The plunger clamp 300 includes a multi-piece body 302 including a first end 305 that is adapted to couple with a plunger, such as the plunger 200 shown in FIG. 2. The plunger clamp 300 includes a second end 310 that is adapted to to couple to a pony rod, such as the pony rod 114 if FIG. 1. A collar or clamp connector 315 is disposed between the first end 305 and the second end 310.

Holes 320 are formed in both of the first end 305 and the second end 310 along a longitudinal axis 322 of the body 302 for connecting to the plunger and the pony rod using fasteners (not shown), such as bolts or screws. Blind holes 325, which may comprise a tool interface, are formed in at least a portion of the body 302 along a radial direction (orthogonal to the direction of the longitudinal axis 322 of the body 302) for coupling the first end 305 to the second end 310. For example, blind holes 325 may be formed in the clamp connector 315 and at least one of the first end 305 (as shown) or the second end 310, providing an interface for a tool (not shown), such as a spanner wrench, in order to rotate the clamp connector 315 relative to the first end 305 and/or the second end 310. Other tool interfaces are contemplated, such as two or more flats formed on a perimeter of the first end 305 or the second end 310, and on a perimeter of the clamp connector 315 for using a conventional open end wrench. In another example, grooves may be formed on a perimeter of the first end 305 or the second end 310, and on a perimeter of the clamp connector 315 in order to increase friction when using a tool, such as a chain wrench, in order to rotate the clamp connector 315 relative to the first end 305 and/or the second end 310.

As shown in FIGS. 3B and 3C, the first end 305 and the clamp connector 315 includes a threaded connection 330. The threaded connection 330 allows the first end 305 to be fixed to the second end 310, or allows the first end 305 to be separated from the second end 310. In FIG. 3C, the clamp connector 315 includes female threads 335 and the first end 305 includes male threads 340. The male threads 340 may be inserted into an opening 345 formed in a center of the clamp connector 315. The male threads 340 may be broken by recessed portions 350. Additionally, the second end 310 includes recessed portions 355 formed in a side thereof. The recessed portions 350, 355 correspond to positions of the openings 320 and may be utilized to provide space for a fastener (not shown), such as a fastener head or a nut. As shown in FIGS. 3B and 3C, a circular retainer member 360, such as a snap ring may be utilized to couple the second end 310 to the clamp connector 315. An annular groove 365 formed in the second end 310 may be used to capture the circular retainer member 360. Alternatively, the circular retainer member 360 and groove 365 may be replaced by a threaded ring (not shown) that may be attached to threads (not shown) formed on an end 370 of a hub 375 of the second end 310.

An example for coupling the plunger clamp 300 to the plunger, such as the plunger 200 and the pony rod, such as the pony rod 114, is as follows. The first end 305 may be disconnected from the clamp connector 315 for this exemplary coupling procedure. Likewise, the clamp connector 315 may be disconnected from the second end 310 for this exemplary coupling procedure.

Both of the first end 305 and the second end 310 may be coupled to the plunger and the pony rod, respectively, using fasteners. The fasteners can be tightened and torqued according to specifications as the first end 305 and the second end 310 are disconnected from each other as well as the threaded connection 330. Then, the clamp connector 315 may be coupled to the second end 310 by positioning the opening 345 about the hub 375, and attaching the circular retainer member 360 thereon to secure the clamp connector 315 to the second end 310. The clamp connector 315 may then be rotated onto the threads 330 of the first end 305 to bring the first end 305 closer to the second end 310. The first end 305 and the clamp connector 315 may be tightened using the blind holes 325. A torque value may be specified for the threaded connection 330 to ensure the threaded connection 330 does not loosen over time.

Figure 4:
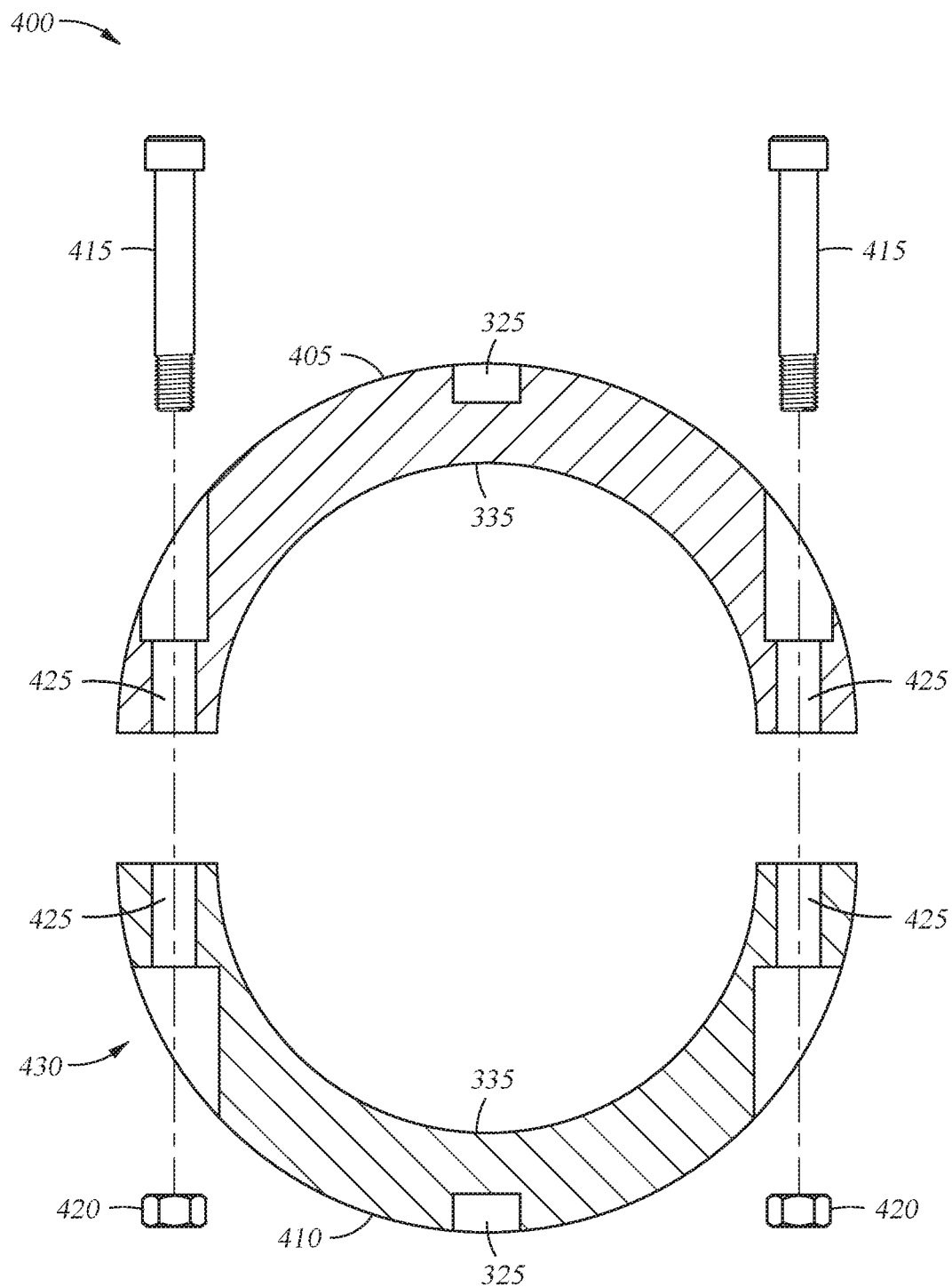
FIG. 4 is a schematic side cross-sectional view of another embodiment of a clamp connector.

FIG. 4 is a schematic side cross-sectional view of another embodiment of a clamp connector 400 that may be utilized to replace the clamp connector 315 of FIGS. 3A-3C. The clamp connector 400 includes a split-ring collar having a first portion 405 and a second portion 410 adapted to be coupled to each other using fasteners, such as a bolt 415 and a nut 420. The fasteners may be disposed in through-holes 425 formed in both of the first portion 405 and the second portion 410. Torque values may be specified for the bolts 415 and the nuts 420. The first portion 405 and the second portion 410 includes the blind holes 325 formed on a perimeter thereof as well as female threads 335 formed on an interior surface thereof. When the first portion 405 and the second portion 410 are coupled together, a connector body 430 is provided, which may be rotated onto the threads 330 of the first end 305 to bring the first end 305 closer to the second end 310. The blind holes 325 may be utilized to tighten the connector body 430 according to the exemplary installation procedure described above.

Figure 5A:
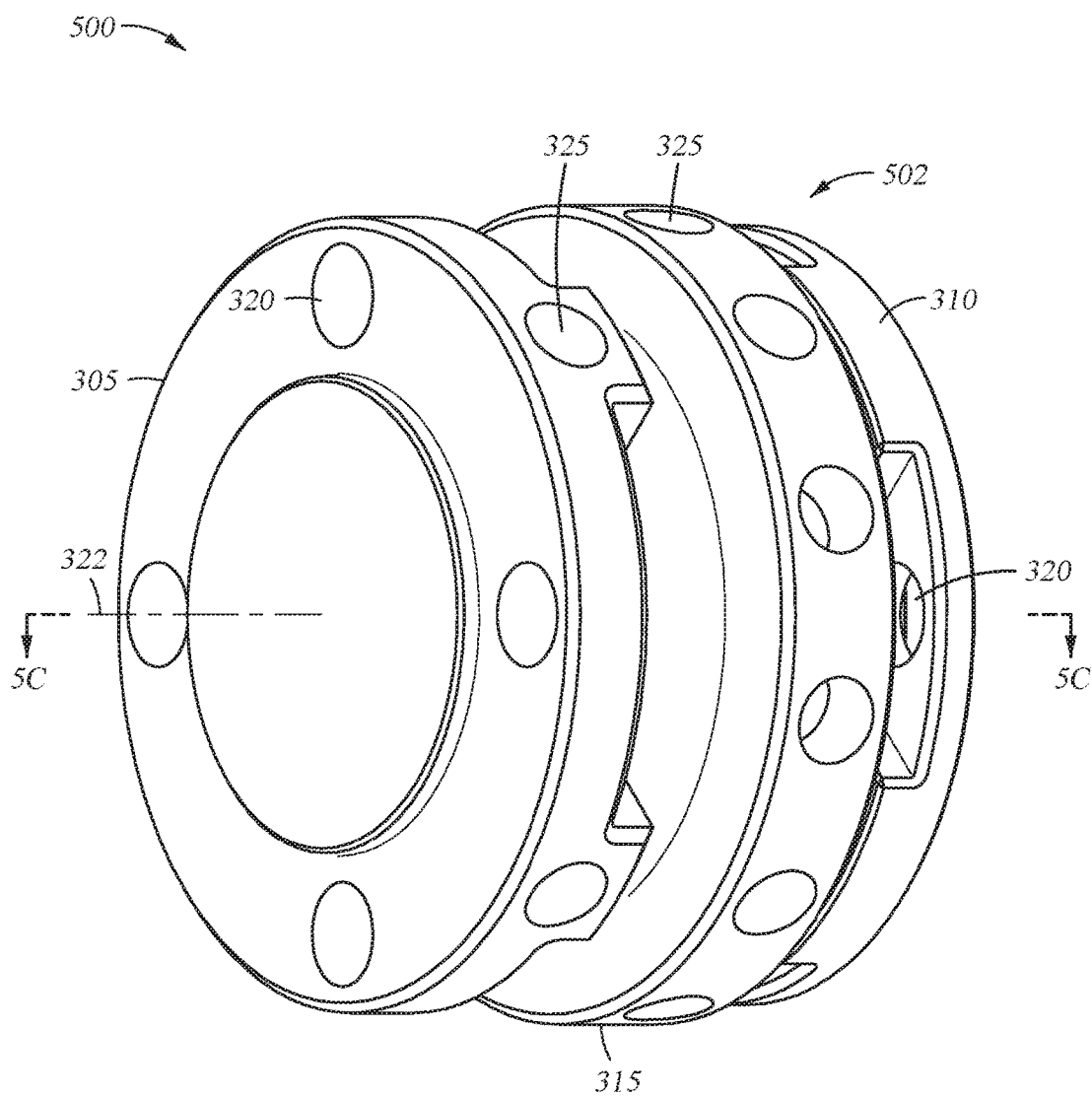
FIG. 5A is an isometric view of another embodiment of a plunger clamp.
Figure 5B:
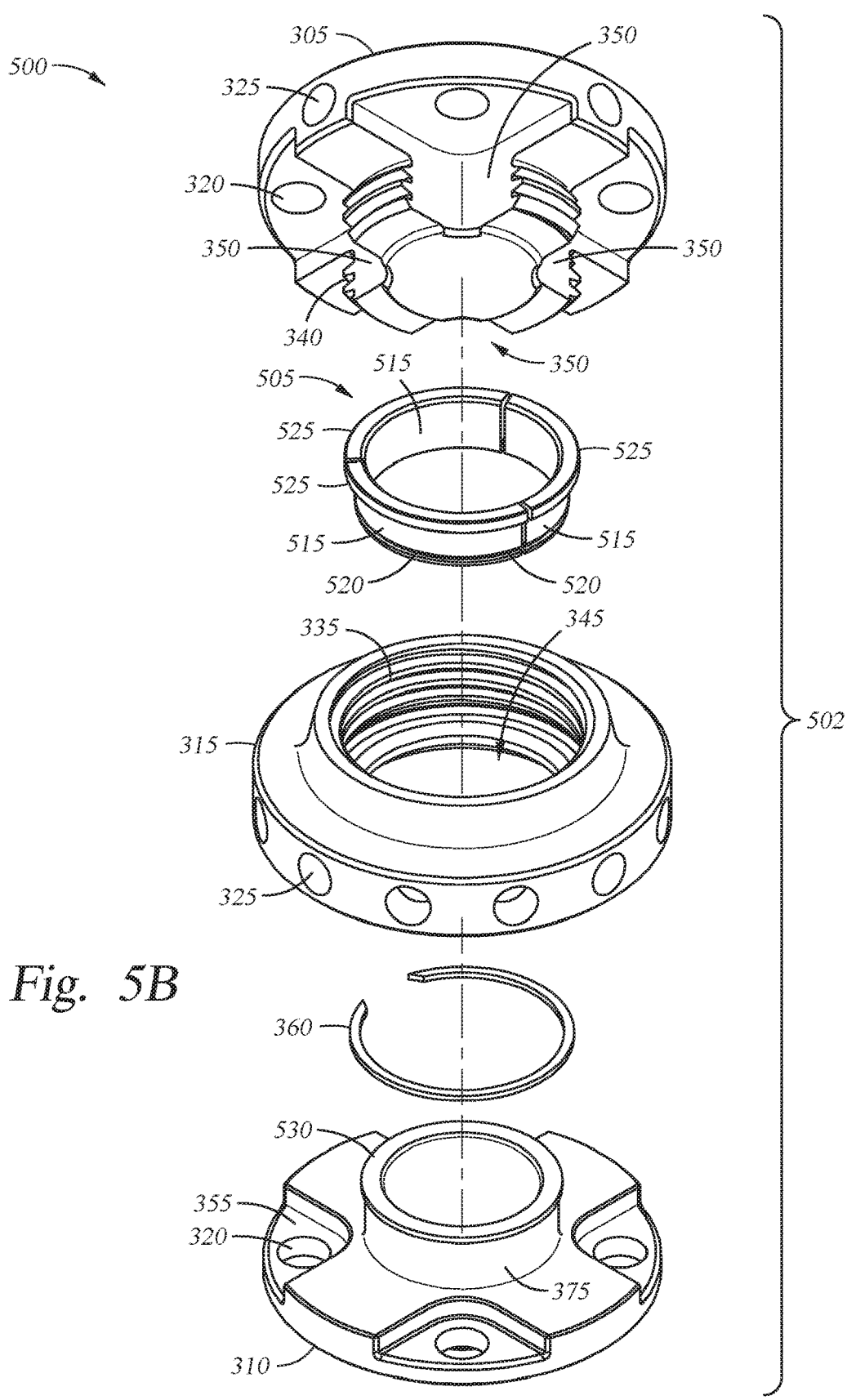
FIG. 5B is an exploded isometric view of the plunger clamp of FIG. 5A.
Figure 5C:
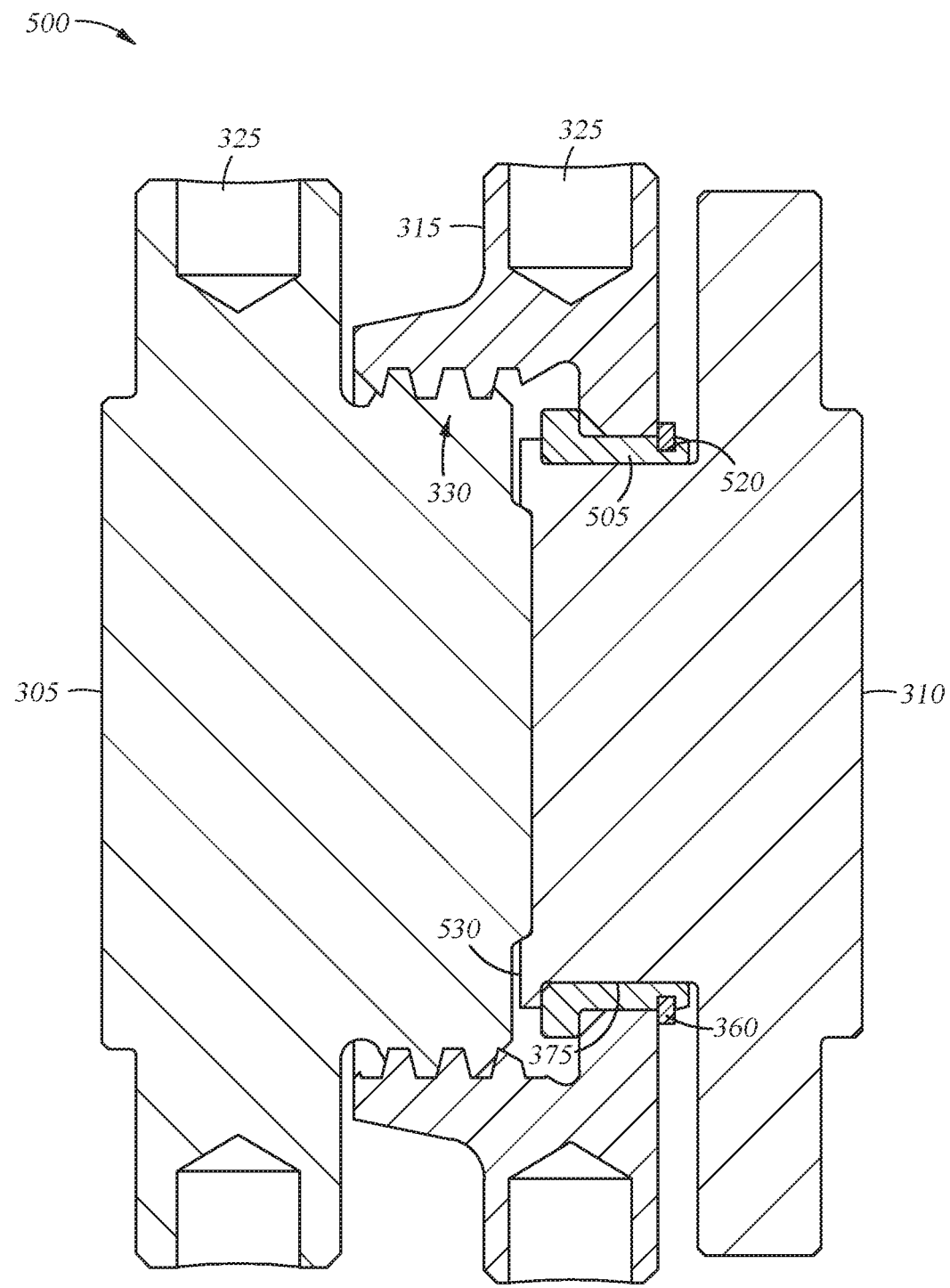
FIG. 5C is a section view of the plunger clamp along lines 5C-5C of FIG. 5A.

FIGS. 5A-5C are various views of another embodiment of a plunger clamp 500 that may be used as the plunger clamp 135 of FIGS. 1 and 2. FIG. 5A is an isometric view of the plunger clamp 500. FIG. 5B is an exploded isometric view of the plunger clamp 500 of FIG. 5A. FIG. 5C is a section view of the plunger clamp 500 along lines 5C-5C of FIG. 5A.

The plunger clamp 500 includes a multi-piece body 502 that is similar to the plunger clamp 300 shown and described in FIGS. 3A-3C with the following exceptions. The plunger clamp 500 includes a segmented retainer 505 (shown in FIGS. 3B and 3C) that in addition to the circular retainer member 360 of FIGS. 3B-3C.

According to this embodiment, the segmented retainer 505 includes a plurality of segments 515 that are coupled to each other using the circular retainer member 360. The segmented retainer 505 may be placed about the hub 375 of the second end 310 in segments 515, and the segments 515 may be retained be installing the circular retainer member 360 in a groove 520 formed in each of the segments 515. Each of the segments 515 of the segmented retainer 505 may include a radial wall 525 formed on each of the segments 515 and the radial walls 525 may be retained on the hub 375 by a circular band 530 formed on the hub 375. The installation of the plunger clamp 500 may be similar to the installation of the plunger clamp 300 described in FIGS. 3A-3C.

Figure 6A:
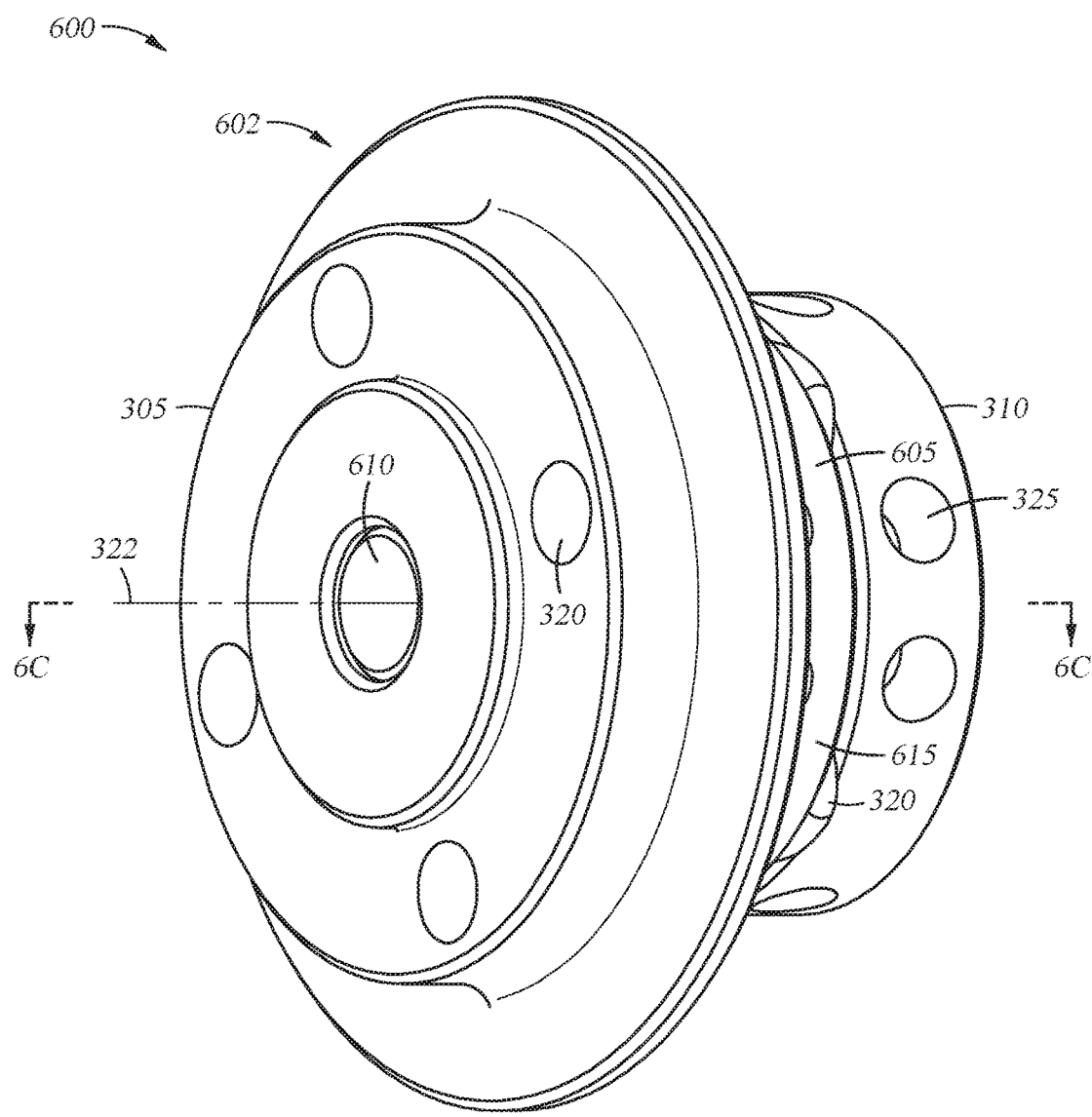
FIG. 6A is an isometric view of another embodiment of a plunger clamp.
Figure 6B:
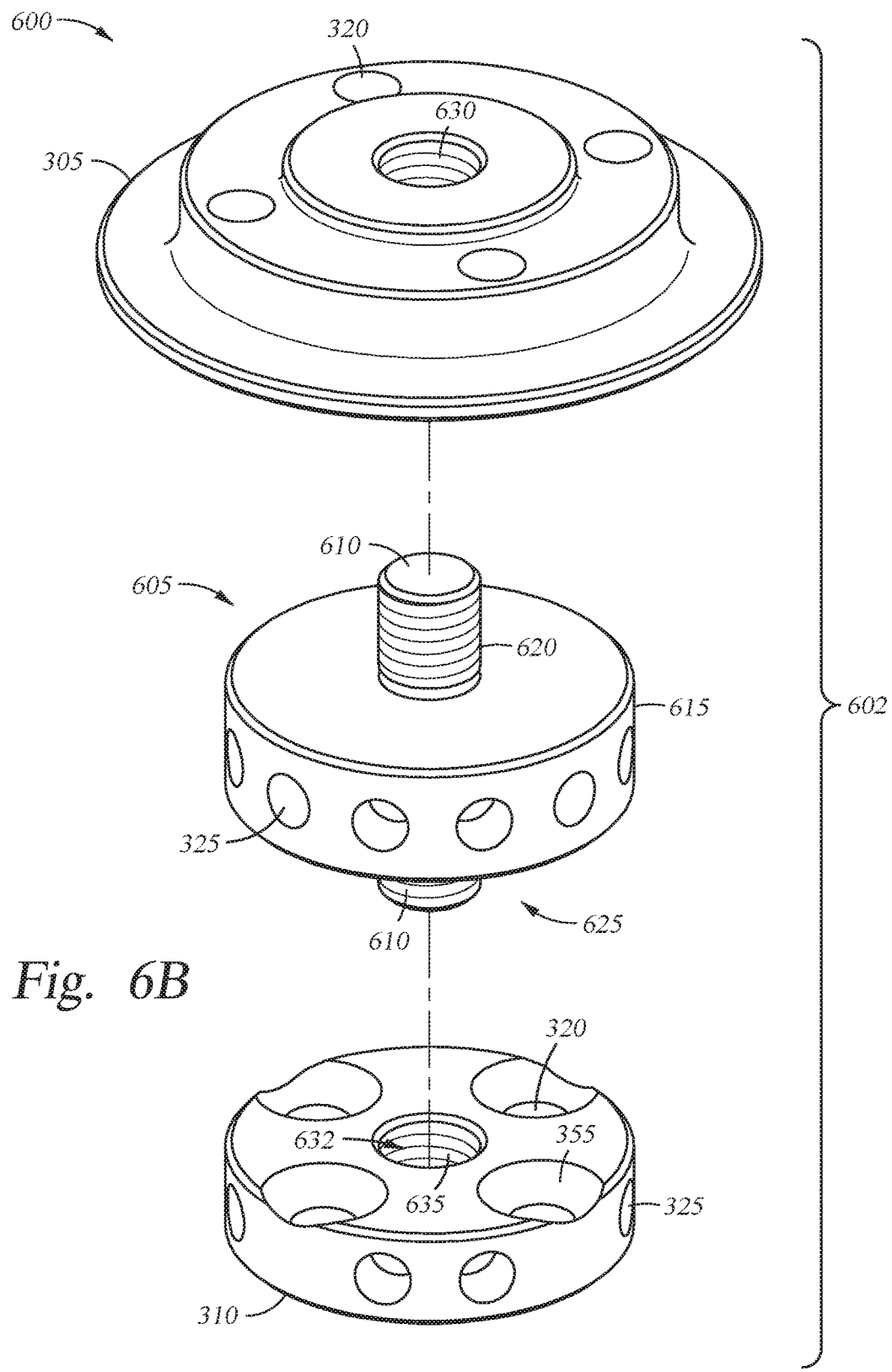
FIG. 6B is an exploded isometric view of the plunger clamp of FIG. 6A.
Figure 6C:
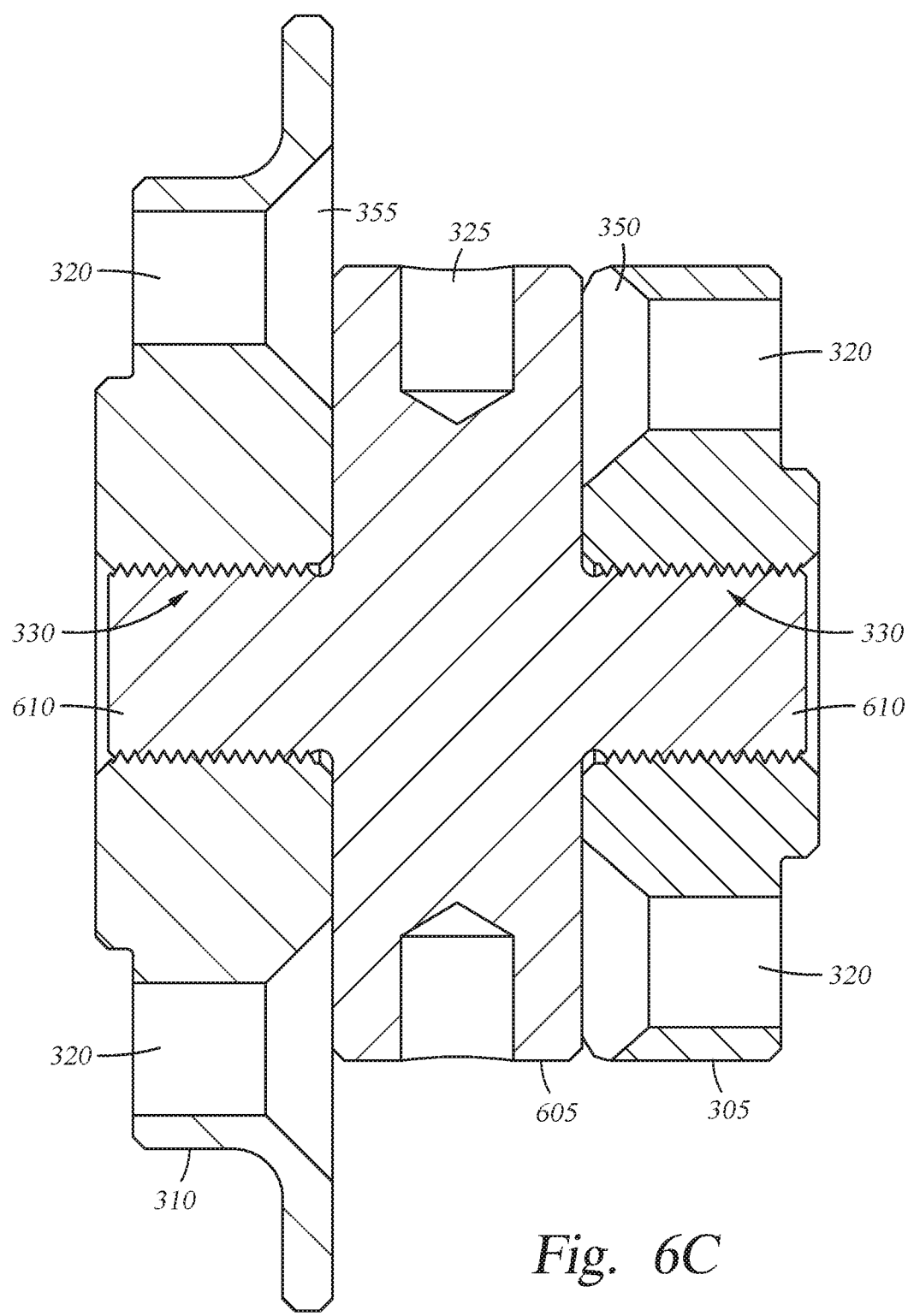
FIG. 6C is a section view of the plunger clamp along lines 6C-6C of FIG. 6A.

FIGS. 6A-6C are various views of another embodiment of a plunger clamp 600 that may be used as the plunger clamp 135 of FIGS. 1 and 2. FIG. 6A is an isometric view of the plunger clamp 600. FIG. 6B is an exploded isometric view of the plunger clamp 600 of FIG. 6A. FIG. 6C is a section view of the plunger clamp 600 along lines 6C-6C of FIG. 6A.

The plunger clamp 600 includes a multi-piece body 602 that is similar to the plunger clamp 300 shown and described in FIGS. 3A-3C with the following exceptions. A clamp connector 605 of the plunger clamp 600 includes threaded members 610 extending from a central flange 615 thereof (only one threaded member 610 is shown in FIG. 6A.

As shown in FIGS. 6B and 6C, the threaded members 610 include threads 620 and threads 625 that are opposing the threads 620. For example, the threads 620 may be right-handed threads and the threads 625 may be left-handed threads. The threads 620 are adapted to interface with mating threads 630 provided in an opening 632 of the first end 305. Likewise, the threads 625 are adapted to interface with mating threads 635 provided in an opening 632 of the second end 310.

To couple the plunger clamp 600 to the plunger, such as the plunger 200 and the pony rod, such as the pony rod 114, the first end 305 may be disconnected from the clamp connector 605. Likewise, the clamp connector 605 may be disconnected from the second end 310. Both of the first end 305 and the second end 310 may be coupled to the plunger and the pony rod, respectively, using fasteners. The fasteners can be tightened and torqued according to specifications as the first end 305 and the second end 310 are disconnected from each other as well as the clamp connector 605.

The threaded connection 330 provided by the threads 620 and 630, and the threads 625 and 635 may provide a configuration such that the clamp connector 605 functions as a turnbuckle. After the connection of the first end 305 and the second end 310 to the plunger and the pony rod, respectively, the clamp connector 605 may be coupled to the first end 305 by rotating the clamp connector 605 relative to the first end 305. Simultaneously, the clamp connector 605 may be coupled to the second end 310 by rotating the clamp connector 605 relative to the second end 310. The blind holes 325 of the clamp connector 605 and/or the first end 305 may be used to tighten the clamp connector 605 to the first end 305 and the second end 310. A torque value may be specified for the threaded connection 330 to ensure the threaded connection 330 does not loosen over time.

Figure 7A:
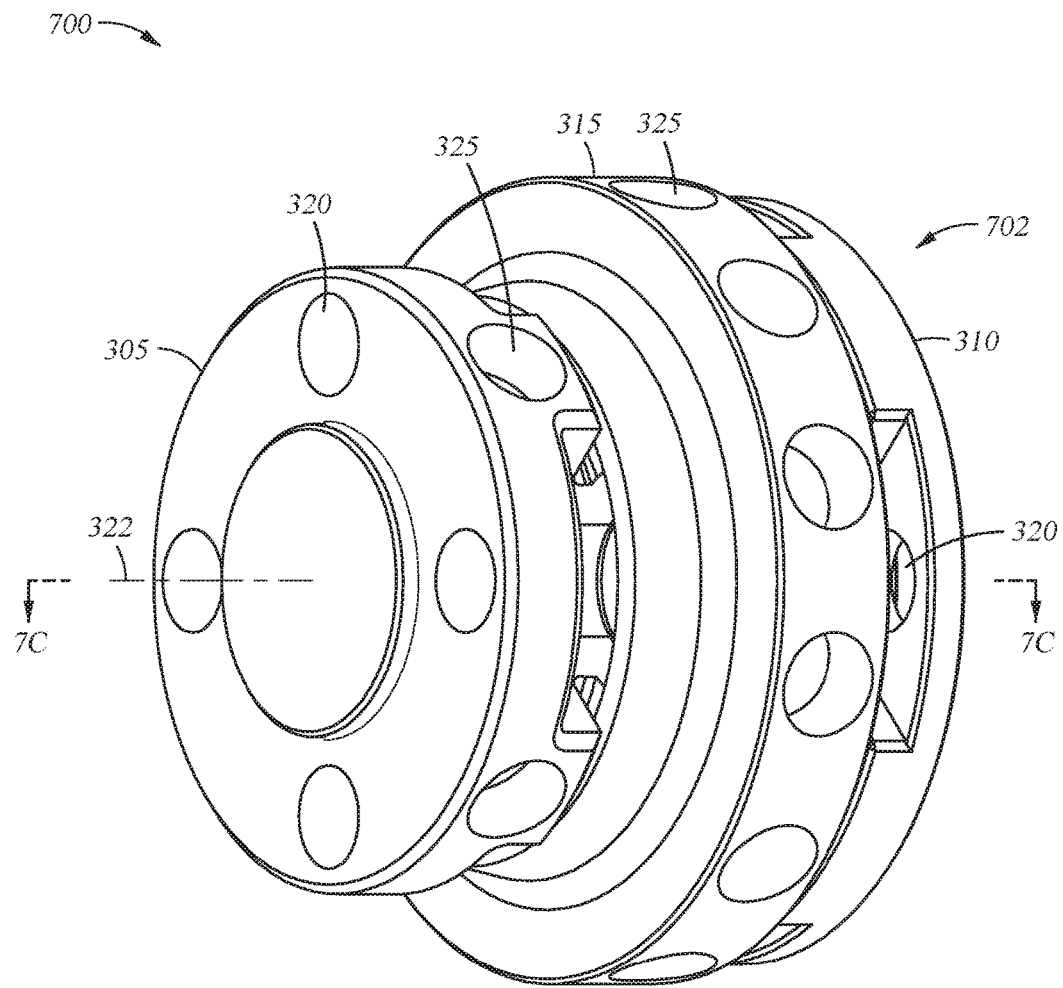
FIG. 7A is an isometric view of another embodiment of a plunger clamp.
Figure 7B:
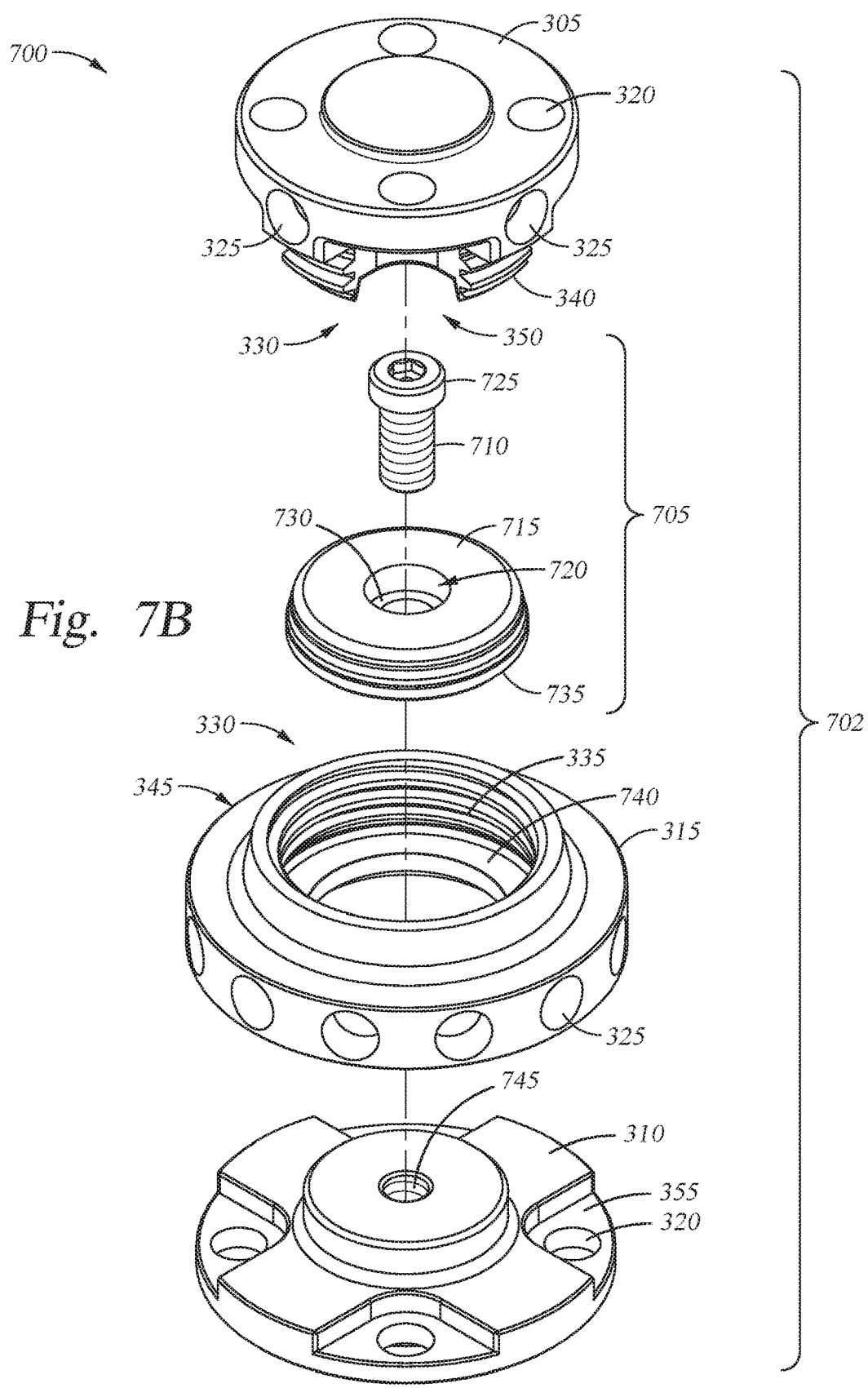
FIG. 7B is an exploded isometric view of the plunger clamp of FIG. 7A.
Figure 7C:
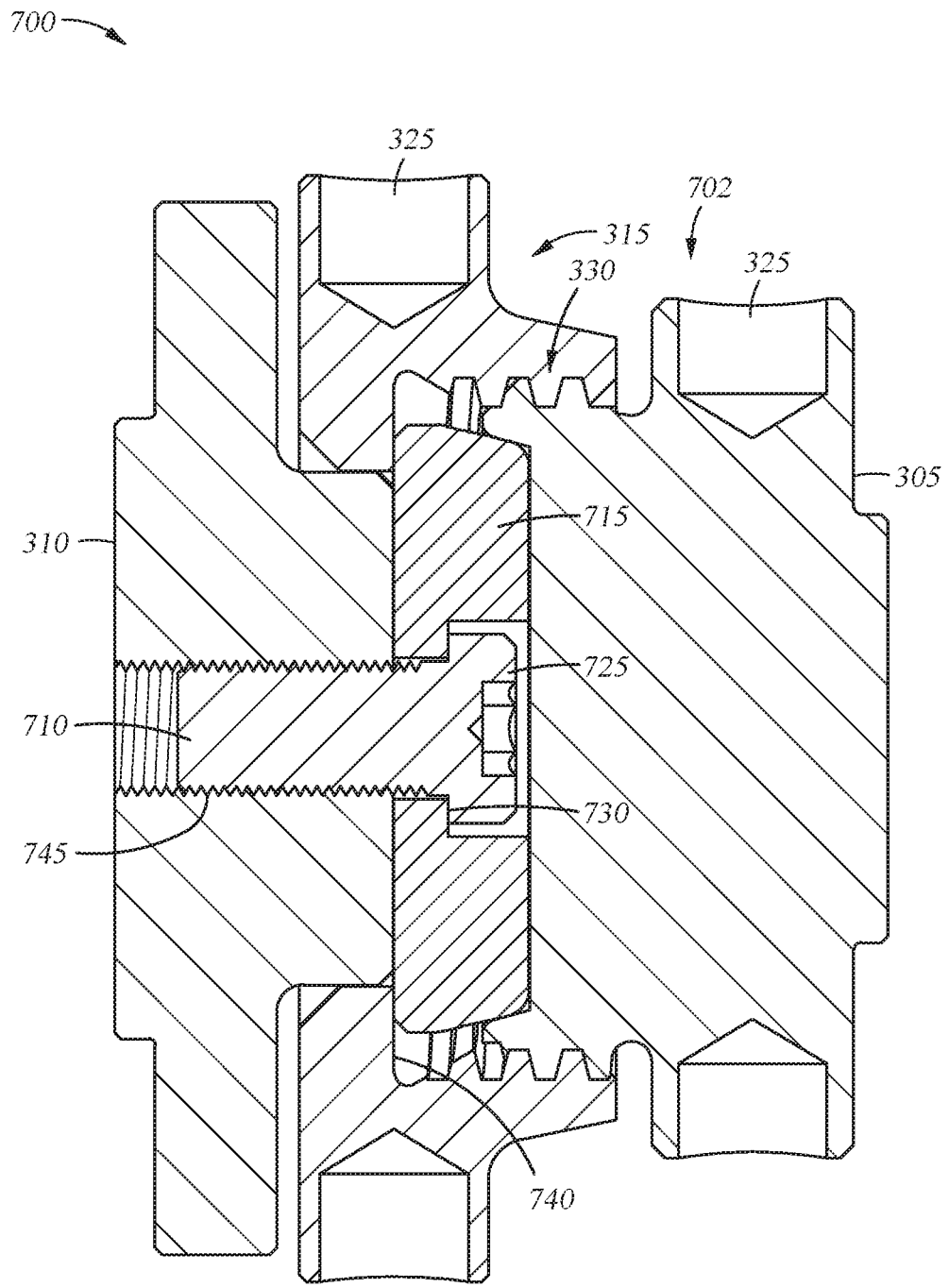
FIG. 7C is a section view of the plunger clamp along lines 7C-7C of FIG. 7A.

FIGS. 7A-7C are various views of another embodiment of a plunger clamp 700 that may be used as the plunger clamp 135 of FIGS. 1 and 2. FIG. 7A is an isometric view of the plunger clamp 700. FIG. 7B is an exploded isometric view of the plunger clamp 700 of FIG. 7A. FIG. 7C is a section view of the plunger clamp 700 along lines 7C-7C of FIG. 7A.

The plunger clamp 700 includes a multi-piece body 702 that is similar to the plunger clamp 300 shown and described in FIGS. 3A-3C with the following exceptions. The plunger clamp 700 includes a center retainer 705 (shown in FIGS. 7B and 7C) explained in greater detail below.

The plunger clamp 700 includes a multi-piece body 702 including a first end 305 that is adapted to couple with a plunger, such as the plunger 200 shown in FIG. 2. The plunger clamp 700 includes a second end 310 that is adapted to couple to a pony rod, such as the pony rod 114 shown in FIG. 1. A collar or clamp connector 315 is disposed between the first end 305 and the second end 310.

Holes 320 are formed in both of the first end 305 and the second end 310 along a longitudinal axis 322 (shown in FIG. 7A) of the body 702 for connecting to the plunger and the pony rod using fasteners, such as bolts or screws. Blind holes 325, which may comprise a tool interface, are formed in at least a portion of the body 702 along a radial direction (orthogonal to the direction of the longitudinal axis 322 of the body 702) for coupling the first end 305 to the second end 310. For example, blind holes 325 may be formed in the clamp connector 315 and at least one of the first end 305 (as shown) or the second end 310, providing an interface for a tool, such as a spanner wrench, in order to rotate the clamp connector 315 relative to the first end 305 and/or the second end 310. Other tool interfaces are contemplated, such as two or more flats formed on a perimeter of the first end 305 or the second end 310, and on a perimeter of the clamp connector 315 for using a conventional open end wrench. In another example, grooves may be formed on a perimeter of the first end 305, the second end 310, and/or the clamp connector 315 in order to increase friction when using a tool, such as a chain wrench, in order to rotate the clamp connector 315 relative to the first end 305 and/or the second end 310.

As shown in FIGS. 7B and 7C, the plunger clamp 700 includes a threaded connection 330. The clamp connector 315 includes female threads 335, and the first end 305 includes male threads 340 that couple to the female threads 335 to form the threaded connection 330. The threaded connection 330 allows the first end 305 to be fixed to the clamp connector 315 and/or the second end 310, or allows the first end 305 to be separated from the clamp connector 315 and/or the second end 310. The male threads 340 may be inserted into an opening 345 formed in a center of the clamp connector 315. The male threads 340 may be broken by recessed portions 350. Additionally, the second end 310 includes recessed portions 355 formed in a side thereof. The recessed portions 350, 355 correspond to positions of the openings 320 and may be utilized to provide space for a fastener, such as a fastener head or a nut.

The center retainer 705 includes a fastener 710 and a retainer plate 715. The retainer plate 715 includes a central opening 720 to receive a portion of the fastener 710 and may be configured as a heavy duty washer. The fastener 710 includes a head 725 that is configured to seat against a shoulder 730, which may be a reduced diameter region of the central opening 720 of the retainer plate 715. The head 725 may be square-sided as shown, or the head 725 may be tapered or flared similar to a screw. The retainer plate 715 includes a perimeter region 735 that is configured to seat against a shoulder 740 of the opening 345, which may be a reduced diameter region of the opening 345 of the clamp connector 315. The fastener 710 is adapted to be received in a threaded through-hole 745 formed in the second end 310 to secure the clamp connector 315 to the second end 310.

An example for coupling the plunger clamp 700 to a plunger and a pony rod, such as the plunger 200 and the pony rod 114 shown in FIGS. 1 and 2, is as follows. The first end 305 initially may be disconnected from the clamp connector 315 for this exemplary coupling procedure. Likewise, the clamp connector 315 may be disconnected from the second end 310 for this exemplary coupling procedure.

Both of the first end 305 and the second end 310 may be coupled to the plunger and the pony rod, respectively, using fasteners. The fasteners can be tightened and torqued according to specifications since the first end 305 and the second end 310 are initially disconnected from each other as well as from the clamp connector 315. Then, the center retainer 705 may be coupled to the second end 310 to secure the clamp connector 315 to the second end 310. For example, the fastener 710 may be inserted into the central opening 720 of the retainer plate 715. The fastener 710 may be coupled to the threaded through-hole 745 and tightened to secure the perimeter region 735 of the retainer plate 715 against the shoulder 740 of the opening 345. Then the clamp connector 315 may be rotated onto the threads 330 of the first end 305 to bring the first end 305 closer to the second end 310. The first end 305 and the clamp connector 315 may be tightened using the blind holes 325. A torque value may be specified for the threaded connection 330 to ensure the threaded connection 330 does not loosen over time.

Figure 8A:
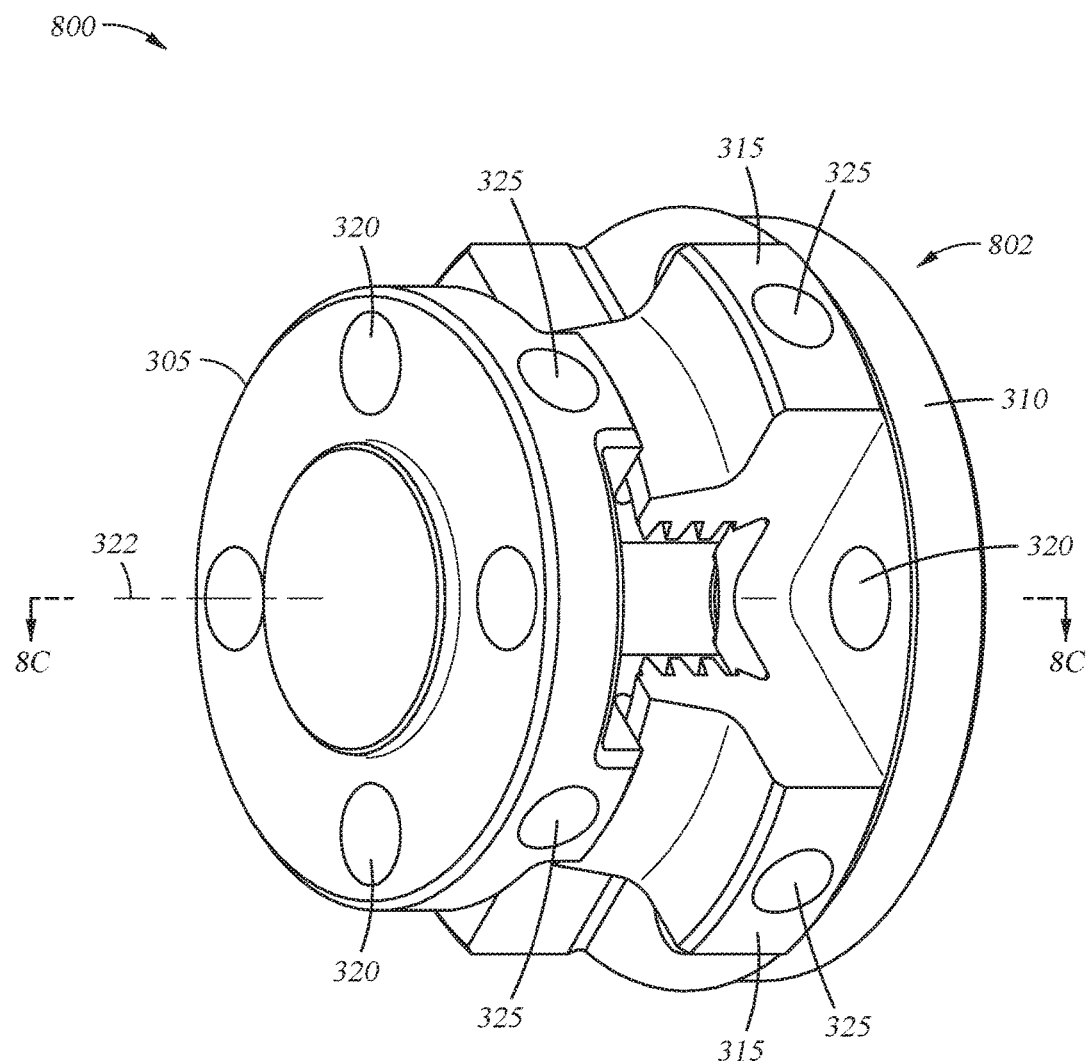
FIG. 8A is an isometric view of another embodiment of a plunger clamp.
Figure 8B:
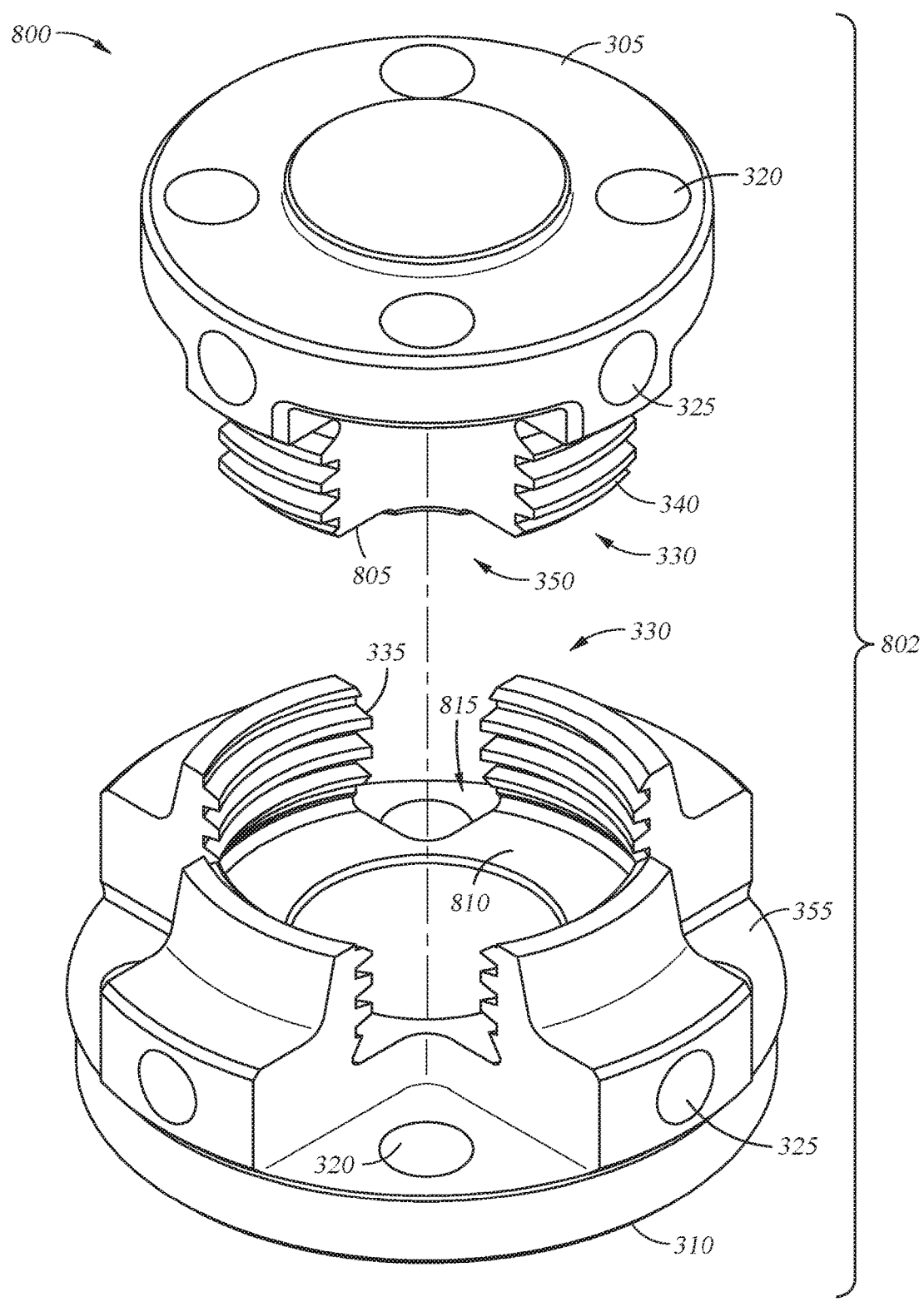
FIG. 8B is an exploded isometric view of the plunger clamp of FIG. 8A.
Figure 8C:
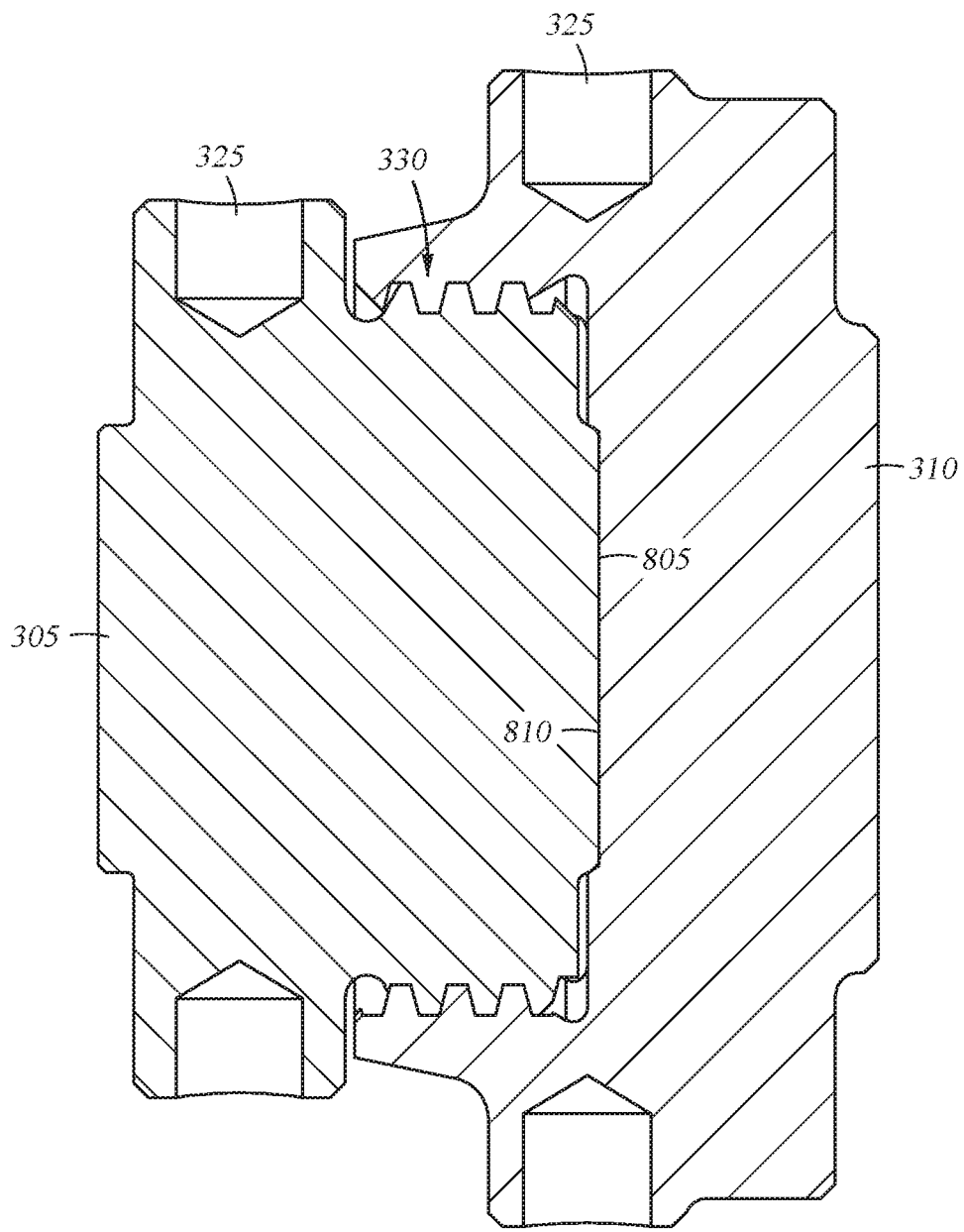
FIG. 8C is a section view of the plunger clamp along lines 8C-8C of FIG. 8A.

FIGS. 8A-8C are various views of another embodiment of a plunger clamp 800 that may be used as the plunger clamp 135 of FIGS. 1 and 2. FIG. 8A is an isometric view of the plunger clamp 800. FIG. 8B is an exploded isometric view of the plunger clamp 800 of FIG. 8A. FIG. 8C is a section view of the plunger clamp 800 along lines 8C-8C of FIG. 8A.

The plunger clamp 800 includes a multi-piece body 802 including a first end 305 that is adapted to couple with a plunger, such as the plunger 200 shown in FIG. 2. The plunger clamp 800 includes a second end 310 that is adapted to couple to a pony rod, such as the pony rod 114 shown in FIG. 1. Holes 320 are formed in both of the first end 305 and the second end 310 along a longitudinal axis 322 (shown in FIG. 8A) of the body 802 for connecting to the plunger and the pony rod using fasteners, such as bolts or screws. Blind holes 325, which may comprise a tool interface, are formed in at least a portion of the body 802 along a radial direction (orthogonal to the direction of the longitudinal axis 322 of the body 802) for coupling the first end 305 to the second end 310. The blind holes 325 may provide an interface for a tool, such as a spanner wrench, in order to rotate the first end 305 relative to the second end 310. Other tool interfaces are contemplated, such as two or more flats formed on a perimeter of the first end 305 and the second end 310 for using a conventional open end wrench. In another example, grooves may be formed on a perimeter of the first end 305 and/or the second end 310 in order to increase friction when using a tool, such as a chain wrench, in order to rotate the first end 305 relative to the second end 310.

As shown in FIGS. 8B and 8C, the plunger clamp 800 includes a threaded connection 330. The second end 310 includes female threads 335, and the first end 305 includes male threads 340 that couple to the female threads 335 to form the threaded connection 330. The threaded connection 330 allows the first end 305 to be fixed to the second end 310, or allows the first end 305 to be separated from the second end 310. A face 805 of the first end 305 is adapted to contact a recessed surface 810 of an opening 815 formed in the second end 310 when the first end 305 and the second end 310 are tightened together. The male threads 340 may be broken by recessed portions 350. Additionally, the second end 310 includes recessed portions 355 formed in a side thereof. The recessed portions 350, 355 correspond to positions of the openings 320 and may be utilized to provide space for a fastener, such as a fastener head or a nut.

An example for coupling the plunger clamp 800 to a plunger and a pony rod, such as the plunger 200 and the pony rod 114 shown in FIGS. 1 and 2, is as follows. The first end 305 initially may be disconnected from the second end 310 for this exemplary coupling procedure. Both of the first end 305 and the second end 310 may be coupled to the plunger and the pony rod, respectively, using fasteners. The fasteners can be tightened and torqued according to specifications since the first end 305 and the second end 310 are initially disconnected from each other. Then, the first end 305 may be coupled to the second end 310 via the threaded connection 330 to secure the ends together by relative rotation. The first end 305 and the second end 310 may be tightened using the blind holes 325. A torque value may be specified for the threaded connection 330 to ensure the threaded connection 330 does not loosen over time.

Figure 9A:
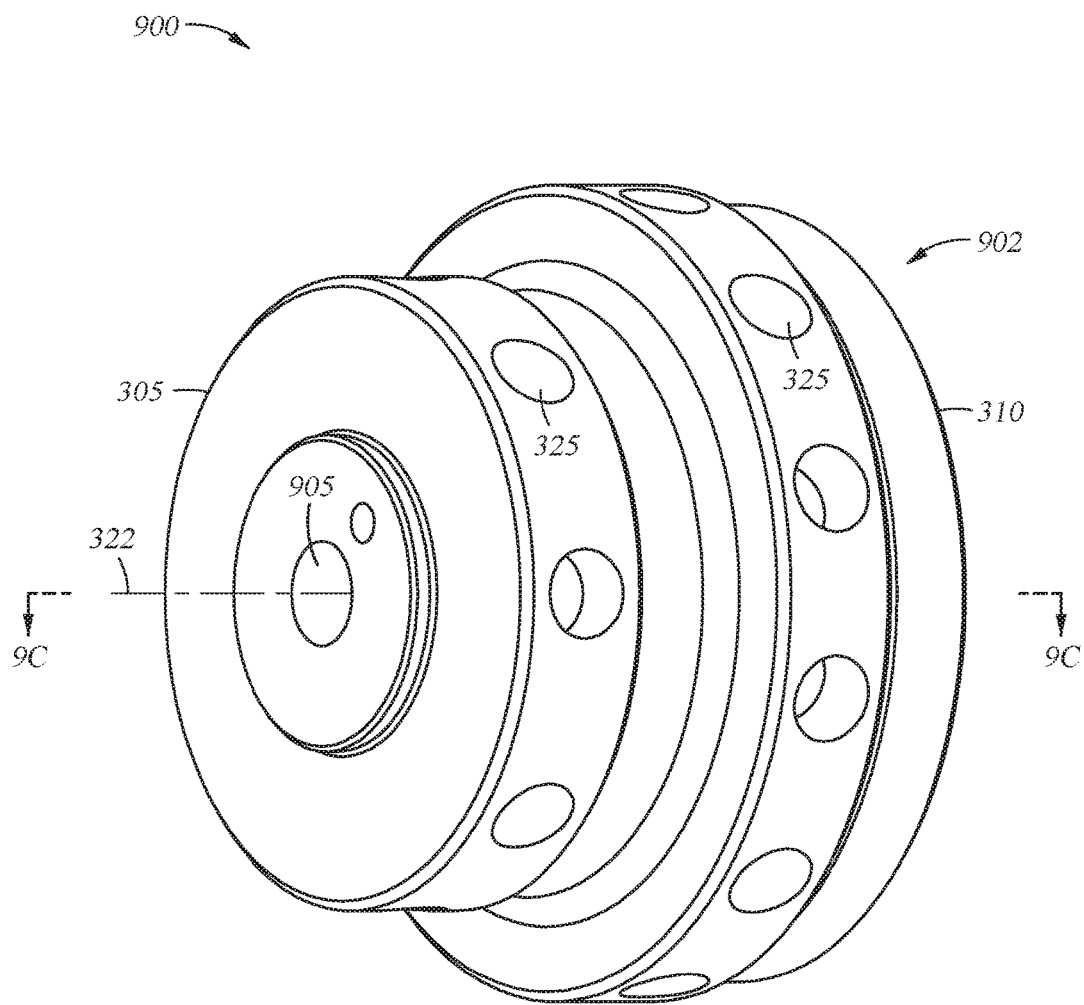
FIG. 9A is an isometric view of another embodiment of a plunger clamp.
Figure 9B:
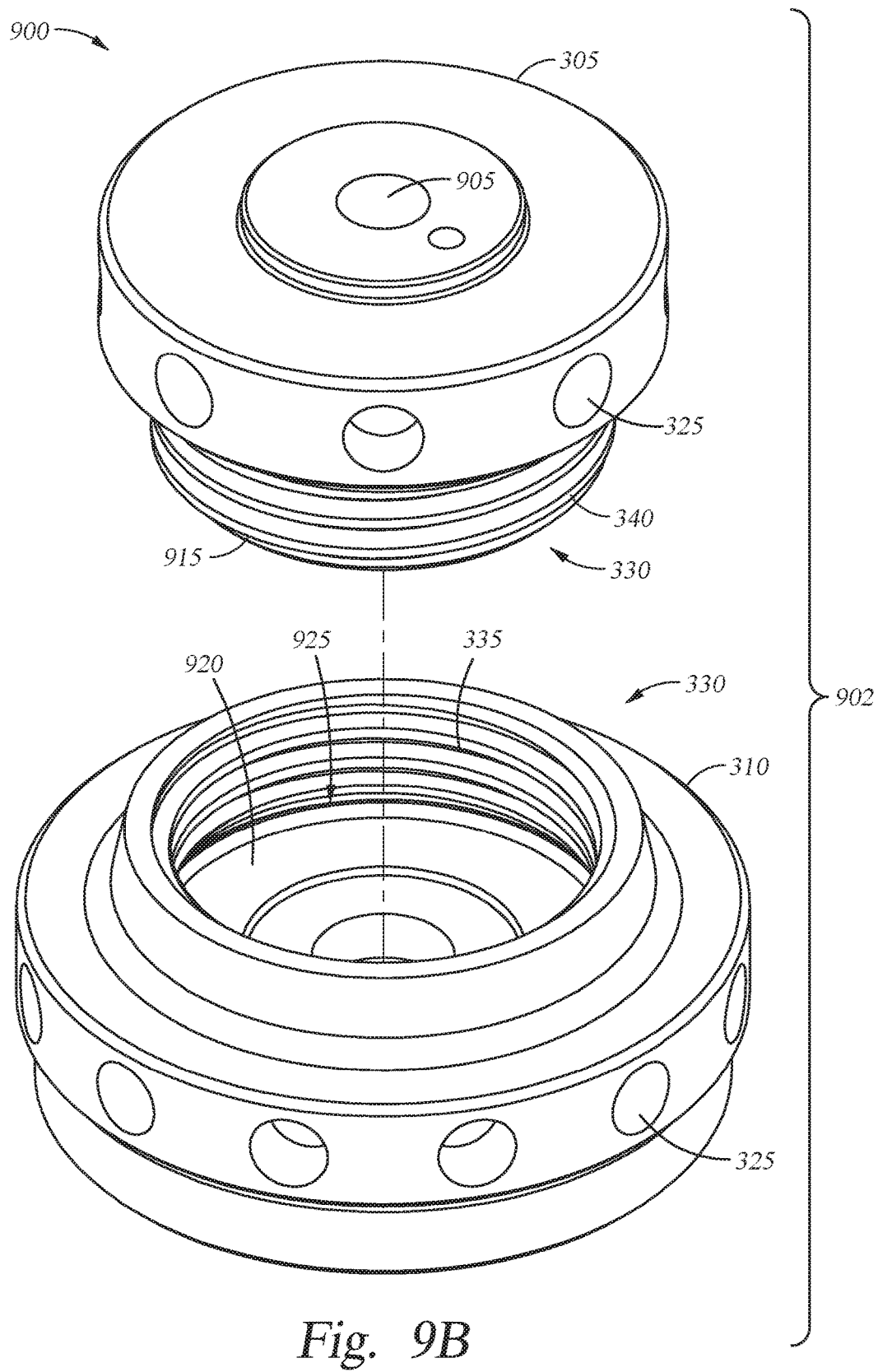
FIG. 9B is an exploded isometric view of the plunger clamp of FIG. 9A.
Figure 9C:
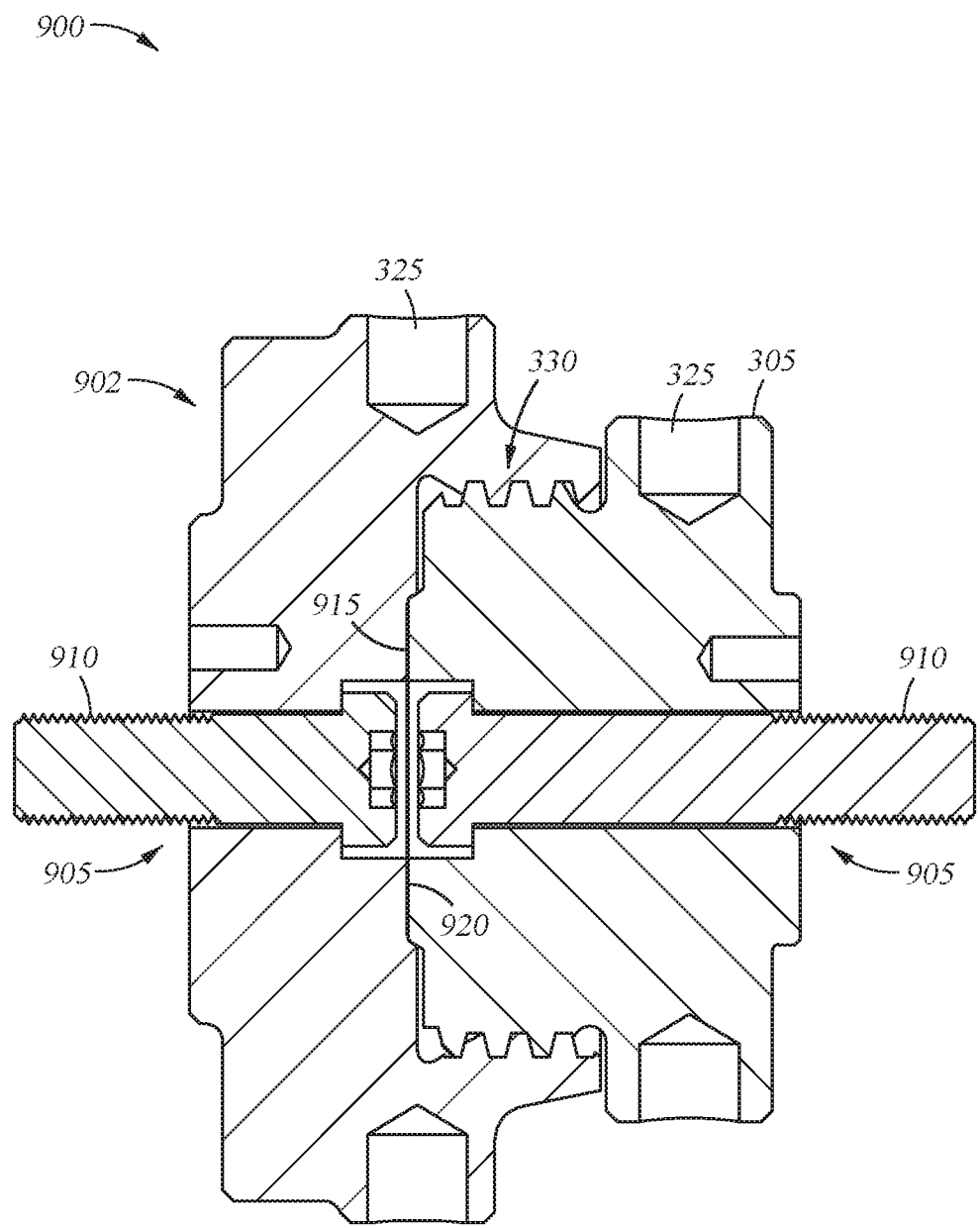
FIG. 9C is a section view of the plunger clamp along lines 9C-9C of FIG. 9A.

FIGS. 9A-9C are various views of another embodiment of a plunger clamp 900 that may be used as the plunger clamp 135 of FIGS. 1 and 2. FIG. 9A is an isometric view of the plunger clamp 900. FIG. 9B is an exploded isometric view of the plunger clamp 900 of FIG. 9A. FIG. 9C is a section view of the plunger clamp 900 along lines 9C-9C of FIG. 9A.

The plunger clamp 900 includes a multi-piece body 902 including a first end 305 that is adapted to couple with a plunger, such as the plunger 200 shown in FIG. 2. The plunger clamp 900 includes a second end 310 that is adapted to couple to a pony rod, such as the pony rod 114 if FIG. 1. According to this embodiment, a central through hole 905 is formed in both of the first end 305 and the second end 310 (shown in FIG. 9C) along a longitudinal axis 322 (shown in FIG. 9A) of the body 902 for connecting to the plunger and the pony rod using fasteners 910 (shown in FIG. 9C), such as bolts or screws. Blind holes 325, which may comprise a tool interface, are formed in at least a portion of the body 902 along a radial direction (orthogonal to the direction of the longitudinal axis 322 of the body 902) for coupling the first end 305 to the second end 310. The blind holes 325 may provide an interface for a tool, such as a spanner wrench, in order to rotate the first end 305 relative to the second end 310. Other tool interfaces are contemplated, such as two or more flats formed on a perimeter of the first end 305 and/or the second end 310 for using a conventional open end wrench. In another example, grooves may be formed on a perimeter of the first end 305 and/or the second end 310 in order to increase friction when using a tool, such as a chain wrench, in order to rotate the first end 305 relative to the second end 310.

As shown in FIGS. 9B and 9C, the plunger clamp 900 includes a threaded connection 330. The second end 310 includes female threads 335, and the first end 305 includes male threads 340 that couple to the female threads 335 to form the threaded connection 330. The threaded connection 330 allows the first end 305 to be fixed to the second end 310, or allows the first end 305 to be separated from the second end 310. A face 915 of the first end 305 is adapted to contact a recessed surface 920 of an opening 925 formed in the second end 310 when the first end 305 and the second end 310 are tightened together.

An example for coupling the plunger clamp 900 to a plunger and a pony rod, such as the plunger 200 and the pony rod 114 shown in FIGS. 1 and 2, is as follows. The first end 305 initially may be disconnected from the second end 310 for this exemplary coupling procedure. Both of the first end 305 and the second end 310 may be coupled to the plunger and the pony rod, respectively, using the fasteners 910. The fasteners 910 can be tightened and torqued according to specifications as the first end 305 and the second end 310 are initially disconnected from each other. Then, the first end 305 may be coupled to the second end 310 via the threaded connection 330 to secure the ends together by relative rotation. The first end 305 and the second end 310 may be tightened using the blind holes 325. A torque value may be specified for the threaded connection 330 to ensure the threaded connection 330 does not loosen over time.

Embodiments of the plunger clamps 300, 500, 600, 700, 800 and 900 as described herein easily secures a pony rod to a plunger of a fluid end with a connection that enables proper torquing of fasteners, which enables safer operation. The plunger clamps 300, 500, 600, 700, 800 and 900 may be disassembled such that each side (the first end and the second end) can be installed without being connected to each other, which facilitates tightening of fasteners to the required torque values. The plunger clamps 300, 500, 600, 700, 800 and 900 as described herein is usable on existing equipment without any additional machining or retrofitting to existing fluid ends, plungers and/or power ends. The plunger clamps 300, 500, 600, 700, 800 and 900 may be installed without removal of the plunger from the fluid end which saves considerable time. The plunger clamps 300, 500, 600, 700, 800 and 900 may be installed using standard tools, such as spanner wrenches or packing nut bars. The plunger clamps 300, 500, 600, 700, 800 and 900 are significantly cheaper to manufacture than conventional clamps and the side that couples to the plunger (e.g., the first side 305) fits all plunger sizes. This reduces the quantity and cost of expendable parts the operator must keep in inventory as well as reducing operational and maintenance downtime.

While the foregoing is directed to embodiments of the present disclosure, other and further embodiments of the disclosure may be devised without departing from the basic scope thereof, and the scope thereof is determined by the claims that follow.

The invention claimed is:

1. A plunger clamp, comprising:
   a body comprising a first end, a second end, and a clamp connector and a center retainer disposed between the first and second ends, wherein the clamp connector comprises a threaded portion that interfaces with the first end facilitating relative rotation with, and separation from, the first end, and wherein the center retainer comprises a threaded portion that interfaces with the second end facilitating relative rotation with, and separation from, the second end, wherein at least one of the first and second ends include recessed portions corresponding to positions of fastener holes formed therethrough.

2. The plunger clamp of claim 1, wherein the second end includes a central through hole.

3. The plunger clamp of claim 2, wherein the central through hole is threaded.

4. The plunger clamp of claim 2, wherein the center retainer includes a retainer plate having a central opening formed therein.

5. The plunger clamp of claim 1, wherein the threaded portion of the clamp connector comprises female threads.

6. The plunger clamp of claim 1, wherein the threaded portion of the center retainer comprises a fastener.

7. The plunger clamp of claim 1, wherein both of the first end and the clamp connector includes a plurality of blind holes formed on a respective perimeter thereof.

8. A plunger clamp, comprising:
   a body comprising a first end and a second end, wherein the body comprises a threaded portion that facilitates coupling and decoupling of the first and second ends, and wherein at least one of the first end and the second end includes a plurality of blind holes formed on a perimeter thereof that extend in a direction orthogonal to a longitudinal axis of the body, wherein at least one of the first end or the second end includes a threaded central through hole.

9. The plunger clamp of claim 8, wherein the body includes a retainer plate having a central opening formed therein.

10. The plunger clamp of claim 8, further comprising a collar that couples between the first end and the second end.

11. The plunger clamp of claim 8, wherein one or both of the first end and the second end includes a central through hole.

12. A fluid end, comprising:
   a fluid body having a plurality of bores formed therein that intersect at a junction;
   a plunger disposed in one of the plurality of bores; and
   a plunger clamp coupled to the plunger, the plunger clamp comprising:
      a body comprising a first end and a second end, wherein the body comprises a threaded portion that facilitates coupling and decoupling of the first and second ends, and wherein the first end or the second end includes a plurality of blind holes formed on a perimeter thereof that extend in a direction orthogonal to a longitudinal axis of the body, wherein one of the first end or the second end includes a threaded central through hole.

13. The fluid end of claim 12, wherein the body includes a retainer plate having a central opening formed therein.

14. The fluid end of claim 12, further comprising a collar that couples between the first end and the second end.

15. The fluid end of claim 12, wherein both of the first end and the second end includes the threaded central through hole.

16. The fluid end of claim 12, wherein both of the first end and the second end includes the plurality of blind holes formed on a respective perimeter thereof.

* * * * *